US009589272B2

(12) United States Patent
Cheung et al.

(10) Patent No.: US 9,589,272 B2
(45) Date of Patent: Mar. 7, 2017

(54) SYSTEM, METHOD, AND DEVICE FOR ORGANIZING AND PRESENTING DIGITAL FLYERS

(75) Inventors: Matthew Cheung, Mississauga (CA); Jeff Francis, Oakville (CA); Wehuns Tan, Oakville (CA); David Meyers, Mississauga (CA); David Au-Yeung, Toronto (CA)

(73) Assignee: Flipp Corporation, Toronto (CA)

(*) Notice: Subject to any disclaimer, the term of this patent is extended or adjusted under 35 U.S.C. 154(b) by 396 days.

(21) Appl. No.: 13/213,298

(22) Filed: Aug. 19, 2011

(65) Prior Publication Data

US 2013/0044113 A1 Feb. 21, 2013

(51) Int. Cl.
*G06F 17/00* (2006.01)
*G06Q 30/02* (2012.01)
(Continued)

(52) U.S. Cl.
CPC ............ *G06Q 30/02* (2013.01); *G06Q 10/10* (2013.01); *G06F 17/30126* (2013.01); *G06F 17/30864* (2013.01)

(58) Field of Classification Search
CPC ...................... G06F 17/30864; G06F 17/30126
(Continued)

(56) References Cited

U.S. PATENT DOCUMENTS

2002/0140746 A1 10/2002 Gargi
2005/0076167 A1 4/2005 Tanaka
(Continued)

FOREIGN PATENT DOCUMENTS

EP          2204721          7/2010
WO     WO 2005/076167 A1    8/2005
WO     WO 2012/097438 A2    7/2012

OTHER PUBLICATIONS

Nicholls, "A permanent image click gallery with previous/next preview", 2 pages (2009), available at http://www.cssplay.co.uk/menu/click-gallery-preview.html.*

(Continued)

*Primary Examiner* — Andrew McIntosh
(74) *Attorney, Agent, or Firm* — Gowling WLG (Canada) LLP

(57) ABSTRACT

A system, method and communication device are disclosed for organizing and presenting a plurality of digital flyers. Using flyer stack information, which organizes the plurality of digital flyers into at least one flyer stack, the plurality of digital flyers are presented to allow for inter-flyer and intra-flyer navigation. Moreover, the flyer stack information may be used to allow the inter-flyer and intra-flyer content to be searched. This is achieved by providing a method and communication device that receives the flyer stack information from a server, and presents the flyer stack information in a flyer navigation interface. The flyer navigation interface displays the at least one flyer stack, selects the flyer stack from the at least one flyer stack, and displays a digital flyer from the selected flyer stack in the flyer navigation interface as a current digital flyer, including displaying an indication of a next digital flyer in the selected flyer stack, the next digital flyer being accessible by navigating to the indication.

20 Claims, 13 Drawing Sheets

(51) Int. Cl.
*G06Q 10/10* (2012.01)
*G06F 17/30* (2006.01)

(58) Field of Classification Search
USPC .......................................................... 715/200
See application file for complete search history.

(56) References Cited

U.S. PATENT DOCUMENTS

| | | |
|---|---|---|
| 2005/0091127 A1 | 4/2005 | Saltel et al. |
| 2005/0165744 A1* | 7/2005 | Taylor et al. ..................... 707/3 |
| 2005/0256785 A1* | 11/2005 | Entwistle et al. .............. 705/27 |
| 2006/0066510 A1* | 3/2006 | Takahashi ........................ 345/9 |
| 2006/0271884 A1 | 11/2006 | Hurst |
| 2009/0327974 A1* | 12/2009 | Abanami et al. ............. 715/863 |
| 2010/0271401 A1* | 10/2010 | Fong .............................. 345/660 |
| 2011/0074699 A1* | 3/2011 | Marr et al. .................... 345/173 |
| 2012/0032901 A1* | 2/2012 | Kwon ............................ 345/173 |
| 2012/0097438 A1 | 4/2012 | Bae et al. |
| 2012/0311438 A1* | 12/2012 | Cranfill et al. ............... 715/256 |

OTHER PUBLICATIONS

Horn, J. "Sympatico.ca launches a digital flyer basket", May 10, 2012, published by Media In Canada. Retrieved from the Internet: <URL: http://mediaincanada.com/2012/05/10/sympatico-ca-launches-a-digital-flyer-basket/> Published by Media in Canada: Author: Jennifer Horn; Title: Sympatico.ca launches a digital flyer basket; 1 page publication; publicaton date: May 10, 2012.
Supplementary European Search Report for App. No. 12 82 5462 dated Jan. 22, 2015.
Canadian Official Action for App. No. 2,845,242 dated Feb. 1, 2016.

\* cited by examiner

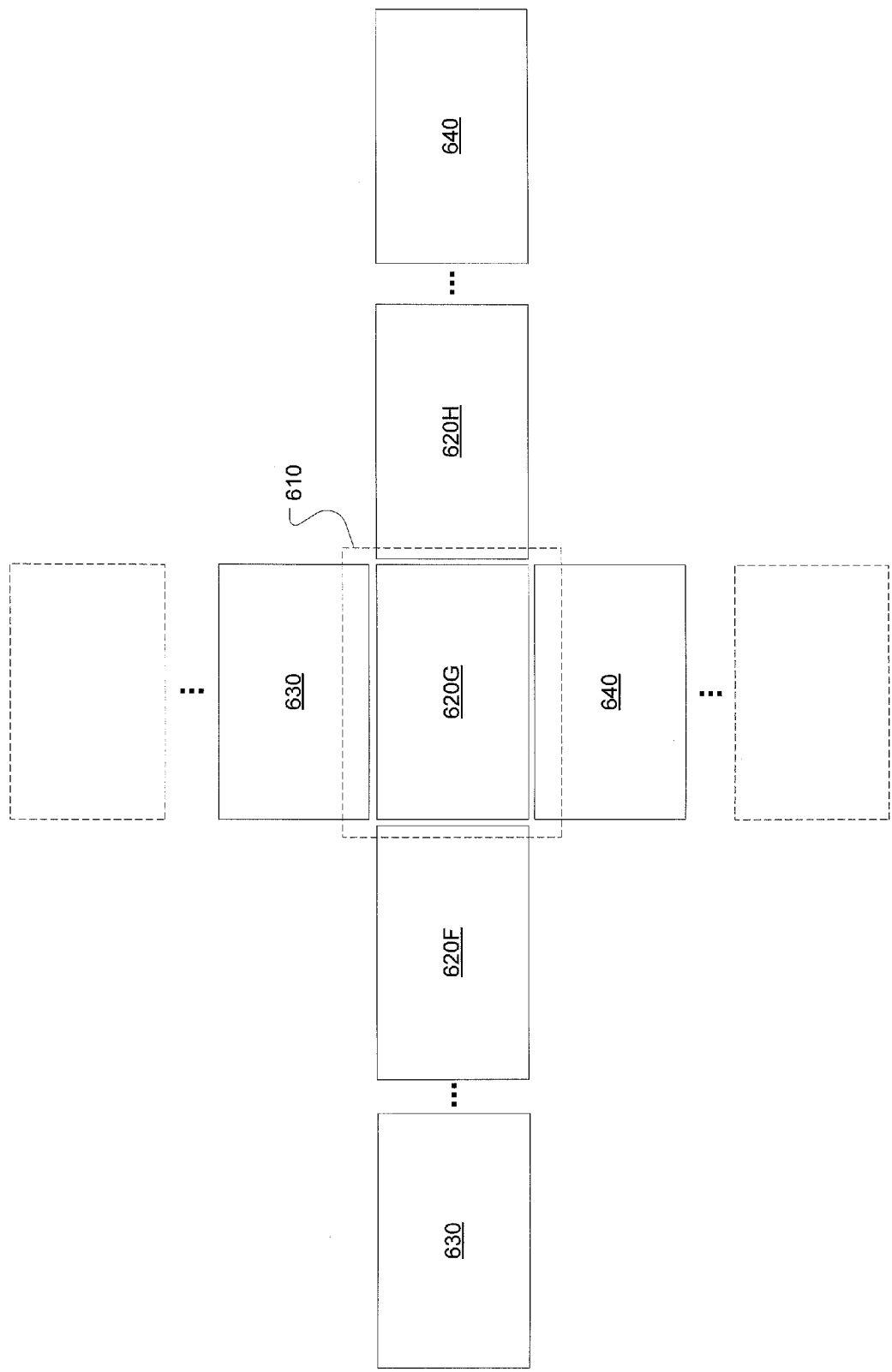

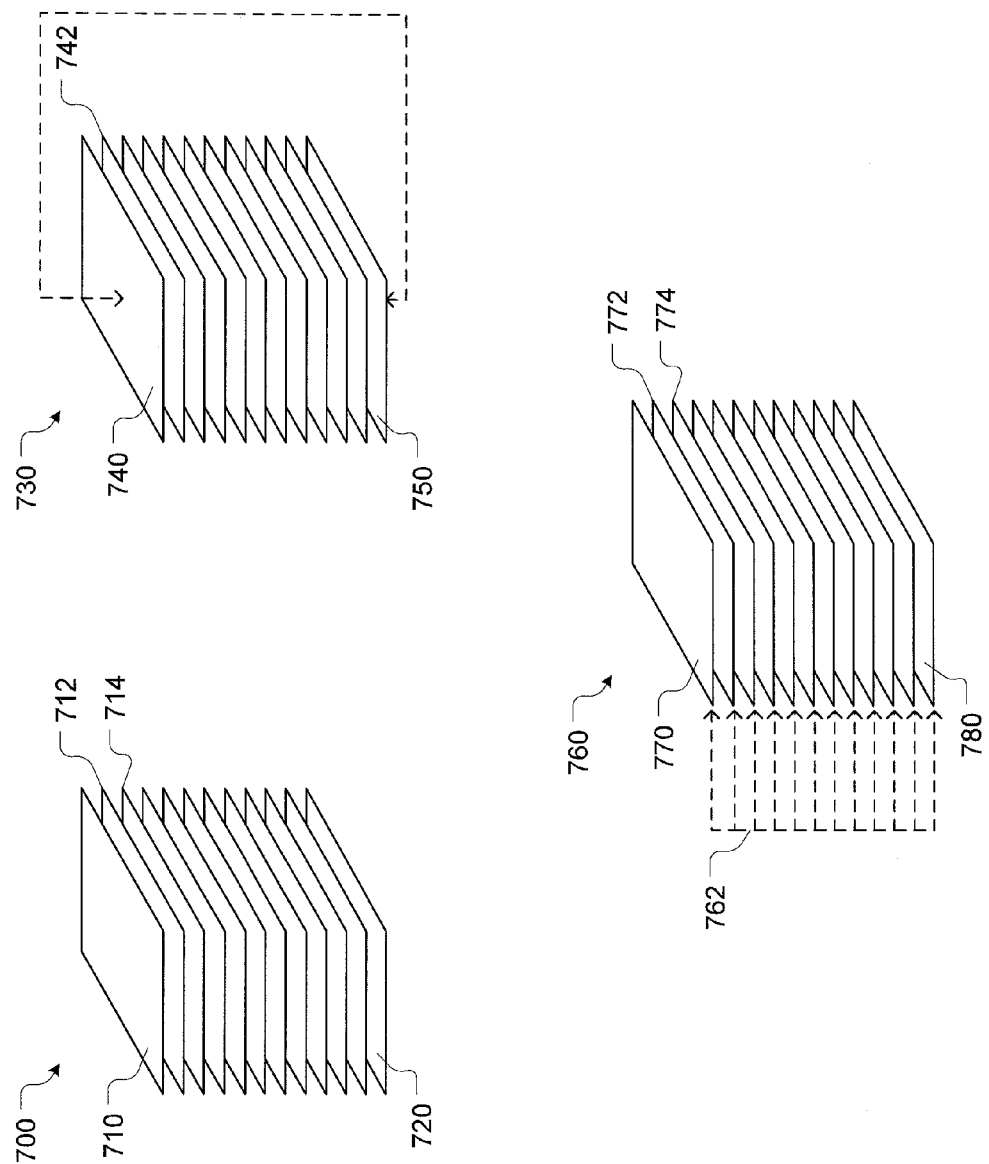

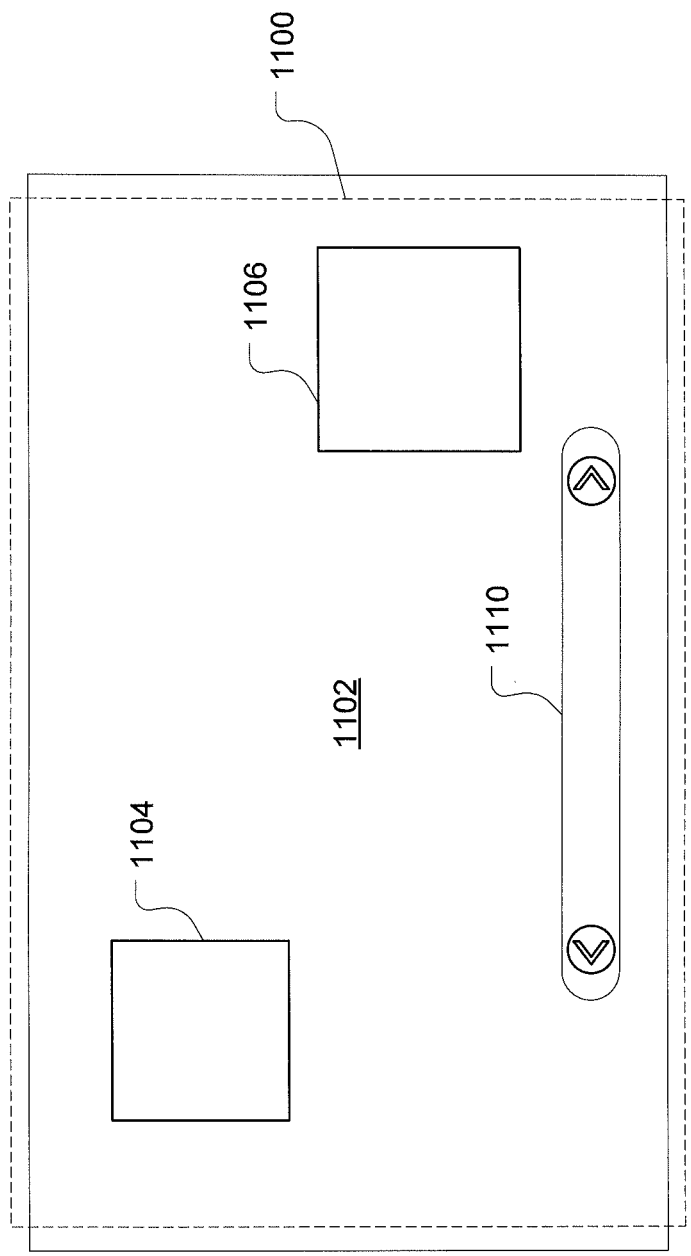

SYSTEM, METHOD, AND DEVICE FOR ORGANIZING AND PRESENTING DIGITAL FLYERS

TECHNICAL FIELD

The present disclosure relates to digital flyers and, in particular, to a system and method for organizing and presenting a plurality of digital flyers.

BACKGROUND

Flyers are a common way for merchants to reach their target customers. They are often delivered in a stack, or bulk, by regional distributors. Over the years, flyers have migrated from paper to digital format with the digital version of the flyer mimicking the paper version. However, current digital flyers are primitive in functionalities, often being a simple scanned version of the printed flyer with certain additional information about the items listed. While more advanced systems exist, they rely on proprietary software that often requires a bulky download. Even with such advanced systems, functionalities are limited. U.S. patent application Ser. Nos. 13/011,602 and 13/011,612, hereinafter referred to as "commonly owned patent applications" and which are incorporated herein by reference, describe an interactive flyer system that utilizes tiling and polygon mapping technology, among other technologies, to enhance the experience of the flyer viewer.

However, existing digital flyer technologies and websites that provide the digital flyers are inadequate in organizing and presenting multiple digital flyers across different merchants. Accordingly, systems and methods that address at least some of these shortcomings remain highly desirable.

SUMMARY

According to an embodiment in the present disclosure, a communication device for displaying a plurality of digital flyers is disclosed. The communication device includes a communication module for receiving flyer stack information from a server, the flyer stack information comprising a plurality of digital flyers organized into at least one flyer stack; and a flyer navigation interface configured to display the at least one flyer stack; select a flyer stack from the at least one flyer stack; and display a digital flyer from the selected flyer stack in the flyer navigation interface as a current digital flyer, including displaying an indication of a next digital flyer in the selected flyer stack, the next digital flyer being accessible by navigating to the indication.

According to another embodiment in the present disclosure, a method of displaying a plurality of digital flyers on a communication device is disclosed. The method, executed on a processor, includes receiving flyer stack information from a server, the flyer stack information comprising a plurality of digital flyers organized into at least one flyer stack; displaying the at least one flyer stack in a flyer navigation interface; selecting a flyer stack from the at least one flyer stack; and displaying a digital flyer from the selected flyer stack in the flyer navigation interface as a current digital flyer, including displaying an indication of a next digital flyer in the selected flyer stack, the next digital flyer being accessible by navigating to the indication.

According to a further embodiment, a computer-readable storage medium comprising instructions in code which when loaded into a memory and executed by a processor of a communication device causes the communication device to perform the method of displaying a plurality of digital flyers on a communication device is disclosed.

According to another embodiment in the present disclosure, a method of organizing a plurality of digital flyers for presentation to a viewer of the digital flyers is disclosed. The method, executed on a processor, includes creating a flyer stack having a stack definition; assigning the plurality of digital flyers to the flyer stack based on contextual relevancy of the digital flyers to the stack definition; determining availability of each digital flyer assigned to the flyer stack based on location relevancy and timing relevancy; and ranking each of the available digital flyer based on a flyer score.

According to another embodiment in the present disclosure, a system for organizing a plurality of digital flyers for presentation to a viewer on a communication device is disclosed. The system includes a flyer stack module for creating flyer stack information, the flyer stack module for creating a flyer stack having a stack definition; assigning the plurality of digital flyers to the flyer stack based on contextual relevancy of the digital flyers to the stack definition; determining availability of each digital flyer assigned to the flyer stack based on location relevancy and timing relevancy; and ranking each of the available digital flyer based on a flyer score; and a communication module for sending the flyer stack information to the communication device.

According to a further embodiment, a computer-readable storage medium comprising instructions in code which when loaded into a memory and executed by a processor of a communication device causes the communication device to perform the method of organizing a plurality of digital flyers for presentation to a viewer of the digital flyers is disclosed.

According to another embodiment in the present disclosure, a communication device for searching a plurality of digital flyers is disclosed. The communication device includes a communication module for sending a search request to a server to search the plurality of digital flyers, the search request comprising viewer information, and for receiving a search result comprising relevant item as contained in the plurality of digital flyers, the relevant item being filtered and organized using flyer stack information; and a display for displaying the relevant item in the search result; and a user interface for reviewing the relevant item as organized.

According to another embodiment in the present disclosure, a method of searching a plurality of digital flyers is disclosed. The method, executed on a processor of a communication device, includes sending a search request to a server to search the plurality of digital flyers, the search request comprising viewer information; receiving a search result comprising relevant item as contained in the plurality of digital flyers, the relevant item being filtered and organized using flyer stack information, the flyer stack information comprising the plurality of digital flyers organized into at least one flyer stack; displaying the relevant item in the search result in a display of the communication device; and providing a user interface for reviewing the relevant item as organized.

According to a further embodiment, a computer-readable storage medium comprising instructions in code which when loaded into a memory and executed by a processor of a communication device causes the communication device to perform the method of searching a plurality of digital flyers is disclosed.

According to another embodiment in the present disclosure, a method of searching a plurality of digital flyers is disclosed. The method, executed on a processor, includes receiving a search request comprising viewer information, wherein the viewer information comprising information about a viewer viewing the plurality of digital flyers on a communication device and information about current digital flyer being viewed by the viewer; retrieving a search result from a search of flyer stack information, the flyer stack information comprising a plurality of digital flyers organized into at least one flyer stack; filtering the search result based on availability of the plurality of digital flyers as determined from the flyer stack information; and ranking the search result based on the at least one flyer stack contained in the flyer stack information.

According to another embodiment in the present disclosure, a system for searching a plurality of digital flyers is disclosed. The system includes a communication module for receiving a search request comprising viewer information, wherein the viewer information comprising information about a viewer viewing the plurality of digital flyers on a communication device and information about current digital flyer being viewed by the viewer, and sending a search result of the plurality of digital flyers to the communication device; and a searching module for completing the search request, wherein the search module is configured to perform a search using flyer stack information, the flyer stack information comprising a plurality of digital flyers organized into at least one flyer stack; filter the search result based on availability of the plurality of digital flyers as determined from the flyer stack information; and rank the search result based on the at least one flyer stack contained in the flyer stack information.

According to a further embodiment, a computer-readable storage medium comprising instructions in code which when loaded into a memory and executed by a processor of a communication device causes the communication device to perform the method of searching a plurality of digital flyers is disclosed.

In some embodiments, the plurality of digital flyers contained in the flyer stack information comprises a reference to the plurality of digital flyers.

In some embodiments, the flyer navigation interface is further configured to receive the content of the digital flyer from the selected flyer stack using the reference contained in the flyer stack information.

In some embodiments, the flyer navigation interface displays the at least one flyer stack as a menu element.

In some embodiments, the menu element is a drop-down menu.

In some embodiments, the current digital flyer initially displayed in the flyer navigation interface is a top ranking digital flyer from the selected flyer stack.

In some embodiments, the indication includes an indication of a previous digital flyer in the selected flyer stack, the previous digital flyer being accessible by navigating to the indication.

In some embodiments, the indication is a user interface element which when selected displays the next digital flyer in the flyer navigation interface.

In some embodiments, the indication is a user interface element which when selected displays the next digital flyer or the previous digital flyer, or both, in the flyer navigation interface.

In some embodiments, the indication is a portion of the next digital flyer in the selected flyer stack, the next digital flyer being accessible by navigating to the portion.

In some embodiments, navigating to the portion comprises panning to the portion or selecting the portion of the next digital flyer or both.

In some embodiments, the indication is a portion of the previous digital flyer or the next digital flyer, or both, in the selected flyer stack, the previous digital flyer or the next digital flyer, or both, being accessible by navigating to the portion.

In some embodiments, navigating to the portion comprises panning to the portion or selecting the portion of the previous digital flyer or both.

In some embodiments, a flyer lock boundary is present, the flyer lock boundary requiring a minimum engagement by a viewer of the digital flyer before switching to the next digital flyer.

In some embodiments, the minimum engagement comprises a minimum pan velocity crossing the flyer lock boundary.

In some embodiments, the minimum engagement comprises a minimum distance beyond the flyer lock boundary.

In some embodiments, the indication includes an indication of a previous page or next page, or both, of the digital flyer in the selected flyer stack, the previous page or next page, or both, of the digital flyer being accessible by navigating to the indication.

In some embodiments, the at least one flyer stack comprises non-circular flyer stack, circular flyer stack, or inter-linked flyer stack, or combination thereof.

In some embodiments, the communication module further receives a selection of at least one digital flyer in the flyer stack information for injection into the flyer navigation interface, the injected at least one digital flyer being accessible from the current digital flyer.

In some embodiments, a plurality of flyer stacks is created, including a featured stack, category-based stack and miscellaneous stack.

In some embodiments, the plurality of digital flyers are assigned to the flyer stack by determining a relevancy score of each of the plurality of digital flyers based on the content of the digital flyer; and assigning the each digital flyer to a flyer stack based on the relevancy score.

In some embodiments, the relevancy score is inputted using a user interface.

In some embodiments, the relevancy score is determined using space occupied by each section on the digital flyer, number of items in each section of the digital flyer or viewer behaviour on search terms or a combination thereof.

In some embodiments, the location relevancy is determined based on location of the viewer relative to a pre-defined distribution zone, or based on distance between a store location of a merchant associated with the digital flyer and the location of the viewer, or combination thereof.

In some embodiments, the location of the viewer is determined through entry by the viewer using a user interface, device specific application programming interface (API), IP geo-location or account profile information, or a combination thereof.

In some embodiments, the location of the viewer is associated with a pre-defined availability zone.

In some embodiments, the timing relevancy is determined based on an availability period or a validity period or both.

In some embodiments, the flyer score is determined based on at least one weighted criterion.

In some embodiments, the at least one weighted criterion comprises quality of the digital flyer, popularity of the digital flyer and associated merchant, budget and revenue optimization, timing and newness of the digital flyer, or personalization and location of the viewer, or a combination thereof.

In some embodiments, the quality of the digital flyer is determined based on size of the digital flyer, quality of source flyer image of the digital flyer, number of items on the digital flyer, sales of items on the digital flyer or visual appeal of the digital flyer, or a combination thereof.

In some embodiments, the visual appeal of the digital flyer is determined using crowd-sourcing.

In some embodiments, the quality of the digital flyer is determined using crowd-sourcing.

In some embodiments, the quality of the digital flyer is determined using feedback data from a feedback system.

In some embodiments, the feedback data comprises engaged visitor rate, time spent on the digital flyer, or interactions with the digital flyer, or a combination thereof.

In some embodiments, the feedback data is considered when a minimum amount of the feedback data is available.

In some embodiments, the popularity of the digital flyer or the popularity of the merchant associated with the digital flyer, or both, is determined by considering number of times the digital flyer is selected from a search result.

In some embodiments, the popularity of the digital flyer or the popularity of the merchant associated with the digital flyer, or both, is determined when a minimum number of the search results have been performed.

In some embodiments, the popularity of the digital flyer or the popularity of the merchant associated with the digital flyer, or both, is determined using feedback data from a feedback system.

In some embodiments, the feedback data comprises data measured through a user interface element.

In some embodiments, the revenue optimization is based on a revenue optimization score, the revenue optimization score being based on price per conversion, conversion rate per view and display revenue per view.

In some embodiments, the budget optimization is based on a soft budget or hard budget or both of a merchant.

In some embodiments, a digital flyer from the at least one flyer stack is selected based on at least one selection criterion, the selected digital flyer for contextual injection.

In some embodiments, the at least one selection criterion is based on manual curation, the at least one flyer stack, or collaborative filtering, or combination thereof.

In some embodiments, the viewer information comprises information about a viewer viewing the plurality of digital flyers and information about current digital flyer being viewed by the viewer.

In some embodiments, the viewer information comprises the flyer stack information.

In some embodiments, the display further highlights the relevant item in the search result on one of the plurality of digital flyers to which the relevant item belongs.

In some embodiments, the user interface comprises user interface element that when selected moves between the relevant item as organized.

In some embodiments, the flyer stack information is retrieved from a memory using the viewer information.

In some embodiments, the flyer stack information is reconstructed using the viewer information.

In some embodiments, the flyer stack information is indexed.

In some embodiments, ranking the search result based on the at least one flyer stack contained in the flyer stack information comprises assigning a first priority to item in the search result belonging to the current digital flyer; assigning a second priority to item in the search result belonging to digital flyer in current flyer stack, wherein the current flyer stack is the flyer stack to which the current digital flyer belongs; and assigning a third priority to item in the search result belonging to digital flyer in other flyer stack, wherein the other flyer stack is the flyer stack to which the current digital flyer does not belong.

In some embodiments, the first priority is higher in ranking order than the second priority, and the second priority is higher in ranking order than the third priority.

BRIEF DESCRIPTION OF THE DRAWINGS

Further features and advantages of the present technology will become apparent from the following detailed description, taken in combination with the appended drawings, in which:

FIG. 6C illustrates another simplified view of the flyer navigation interface shown in FIG. 6A implementing an inter-linked flyer stack;

FIG. 7 illustrates a non-circular, circular and inter-linked flyer stacks;

FIG. 11 illustrates a simplified view of the flyer navigation interface displaying the search result received for a search request of a plurality of digital flyers.

It will be noted that throughout the appended drawings, like features are identified by like reference numerals.

DETAILED DESCRIPTION

Figure 1:
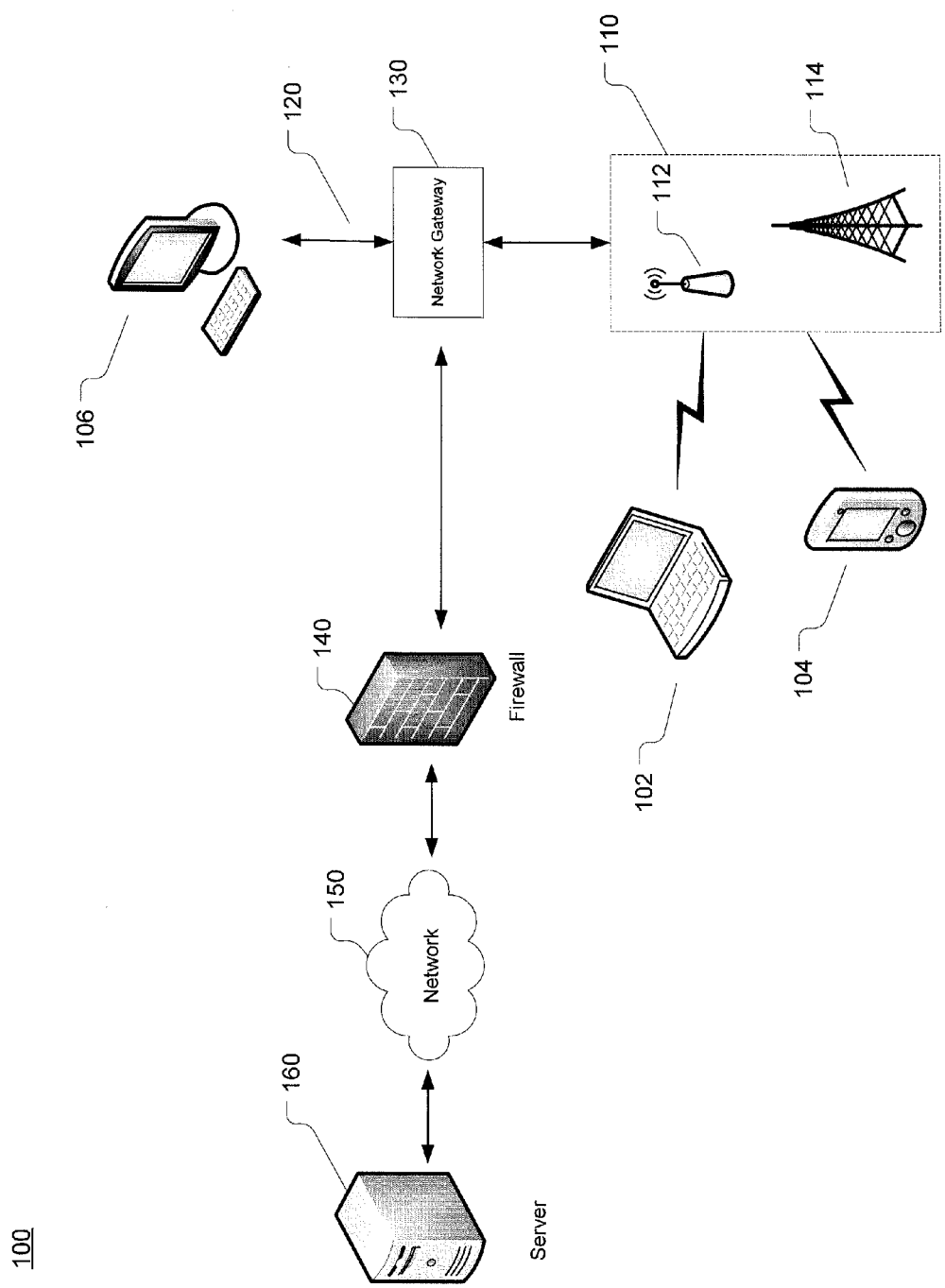
FIG. 1 illustrates a block diagram of a communication system in which an embodiment of the present technology may be applied.

In the present disclosure, a system and method are disclosed for organizing and presenting a plurality of digital flyers. The digital flyers are organized into what is referred to as a flyer stack. There may be one or more flyer stacks and each flyer stack has a stack definition that is used to determine the relevancy of the contained digital flyers. Using this stack definition, the digital flyers are assigned to the one or more flyer stacks. Availability is then determined based on location and timing relevancies. In other words, even though the digital flyer may be assigned to a flyer stack, it may be still unavailable to the viewer. The digital flyers are ranked according to a flyer score that may take into consideration a number of criteria. This information of digital flyer organized into at least one flyer stack is referred to as flyer stack information.

With the flyer stack information, a communication device displays the flyer stack information in an efficient and intuitive way for the flyer viewer to navigate through the plurality of digital flyers. Using the flyer navigation interface displaying the flyer stack information, the viewer is able to navigate not only within a digital flyer (i.e. intra-flyer navigation) but also between other digital flyers (i.e. inter-flyer navigation). Moreover, the viewer is able to search through the plurality of digital flyers efficiently and intuitively by utilizing the flyer stack information.

In this specification and the appended claims, the singular forms "a," "an," and "the" include plural references unless the context clearly dictates otherwise. Unless defined otherwise, all technical and scientific terms used herein have the same meaning as commonly understood to one of ordinary skill in the art to which this disclosure belongs.

It will be further understood that the terms "comprises" or "comprising", or both when used in this specification, specify the presence of stated features, integers, steps, operations, elements, and/or components, but do not preclude the presence or addition of one or more other features, integers, steps, operations, elements, components, and/or groups thereof.

The term "user" in the present disclosure is used to refer to any user of the systems, methods and devices in the present disclosure, including publishers, vendors and viewers.

The term "publisher" refers to the user of the systems, methods and devices in this disclosure responsible for preparing the digital flyers and the flyer stack information according to the present disclosure.

The term "vendor" or "merchant" in this disclosure may be used interchangeably to refer to the business associated with the digital flyer.

The term "viewer" refers to the user of the systems, methods and devices in this disclosure viewing the digital flyer.

The term "flyer" will be used generally to refer to forms of marketing that includes information about the wares and services that businesses offer. "Flyer" may also be known as circulars, pamphlets, handbills, leaflets, ads, catalogues, parts books, and trade literatures. In this specification, the term "flyer" will be used to collectively refer to the aforementioned forms of marketing.

The term "wireless communication technology" is intended to describe any communication protocol that enables a communication device to communicate with a server without wires. By way of example, but not limitation, wireless communication protocol may include IEEE 802.11x standards (sometimes referred to as Wi-Fi) such as, for example, the IEEE 802.11a, 802.11b, 802.11g, and/or 802.11n standard. Other communication protocols include: IEEE 802.16e (also referred to as Worldwide Interoperability for Microwave Access or "WiMAX"); IEEE 802.20 (also referred to as Mobile Wireless Broadband Access); Mobitex Radio Network, DataTAC; GPRS (General Packet Radio System); TDMA (Time Division Multiple Access) including GSM (Global System for Mobile Communication); CDMA (Code Division Multiple Access) including CDMA 2000 and UTRA (Universal Terrestrial Radio Access); FDMA (Frequency Division Multiple Access); OFDMA (Orthogonal FDMA), SC-FDMA (Single-Carrier FDMA); CDPD (Cellular Digital Packet Data); iDEN (integrated Digital Enhanced Network); EvDO (Evolution-Data Optimized); EDGE (Enhanced Data rates for GSM Evolution); UMTS (Universal Mobile Telecommunication Systems); HSPDA (High-Speed Downlink Packet Access); and other various network technologies, including LTE-advanced technologies. An OFDMA system utilizes Orthogonal Frequency Division Multiplexing (OFDM) and sends modulation symbols in the frequency domain on orthogonal subcarriers, and may be implemented in technologies such as E-UTRA or E-UTRAN.

Referring to FIG. 1, there is shown a block diagram of a communication system 100 in which an embodiment of the present technology can be applied. It should be expressly understood that this figure is intentionally simplified to show only certain main components. The communication system 100 may include other components beyond what is illustrated in FIG. 1.

The communication system 100 includes a number of communication devices 102, 104, 106 which may be connected to other devices in the communication system 100 in any of several different ways. Accordingly, three different types of communication devices 102, 104, 106 are depicted in FIG. 1 employing different exemplary ways of connecting to other devices in the communication system 100. It should be expressly understood that communication devices other than those shown in FIG. 1 may be used to connect to the communication system 100. Communication devices 102, 104, 106 may be connected to, for example, the server 160 using wireless technologies or wired communication technologies. The server 160 may implement the flyer stack system that will be described in details below.

In one embodiment, communication devices 102, 104 may connect to the server 160 using wireless communication technology 110. To facilitate the provision of wireless technology 110, there may be provided one or more wireless RF Access Points (AP) 112 and base stations 114.

In another embodiment, communication device 106 may connect to the server 160 using wired communication technology 120 such as IEEE 802.3 standard. Other wired communication technologies may be contemplated by a skilled person in the art.

Using wireless or wired technologies, communication devices 102, 104, 106 connect to the network gateway 130. The internal network 150 is typically behind a firewall 140, which serves to safeguard the internal network 150 from unauthorized access. Only authorized communication devices 102, 104, 106 are granted access to the server 160.

Figure 2:
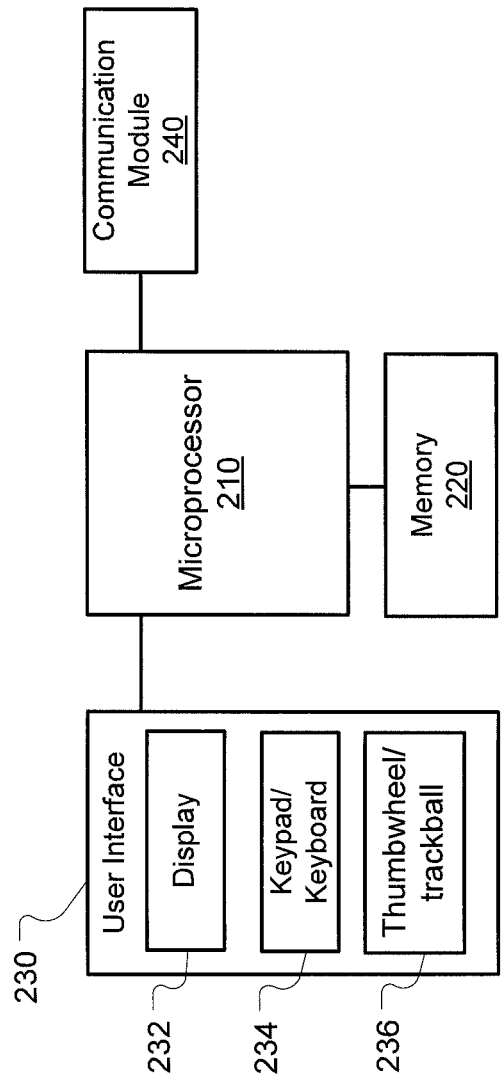
FIG. 2 illustrates a block diagram of a communication device on which an embodiment of the present technology may be implemented.

Now turning to FIG. 2, a block diagram of a communication device in accordance with some embodiments of the present disclosure is shown. The communication device (e.g. 102, 104, 106) includes a microprocessor 210, a memory 220, a user interface 230 and a communication module 240. The memory 220 may be in the form of a random access memory (RAM), flash memory, magnetic disk, solid state drives or other forms of storage format. The user interface 230 serves as the input and output to the user of the communication device. In FIG. 2, the communication device is shown to include a display 232, including a touchscreen display, a keypad/keyboard 234 and a thumbwheel/trackpad 236. The communication device further includes a communication module 240 which may include wireless and wired communication technologies. It will be understood that this figures is intentionally simplified to show only certain main components. The communication device of FIGS. 1 and 2 may include other components beyond what is illustrated in FIG. 2 and exclude some components as illustrated in FIG. 2.

Thus, as it will be described in details below, a system and method is disclosed for organizing and presenting multiple digital flyers to allow for easy and intuitive inter-flyer and intra-flyer navigation and search. The details and particulars of these aspects of the technology will now be described below, by way of example, with reference to the attached drawings.

Flyer Stack—Overview

In the present disclosure, digital flyers from multiple merchants are organized into what is referred to as a flyer stack. There may be one or more flyer stacks with each flyer stack having a particular stack definition that defines the relatedness of the contained flyers. For example, one flyer stack may be for groceries while another flyer stack may be for electronics. Viewed another way, the flyer stack can be analogized with a bundle of paper flyers that arrives in the mailbox. However, unlike these junk mails, the flyer stack in the present disclosure contains highly relevant and dynamic digital flyers that allows for easy inter-flyer and intra-flyer navigation and search.

Figure 3:
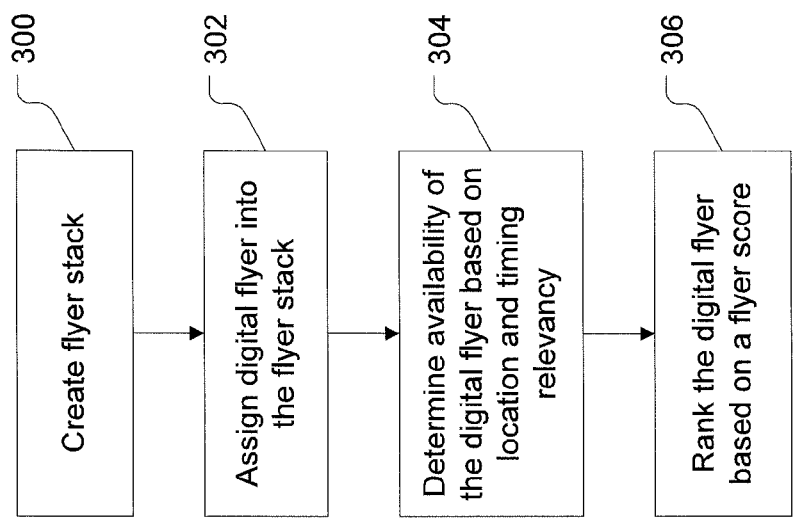
FIG. 3 illustrates a process for organizing digital flyers into at least one flyer stack according to an embodiment of the present technology.
Figure 4:
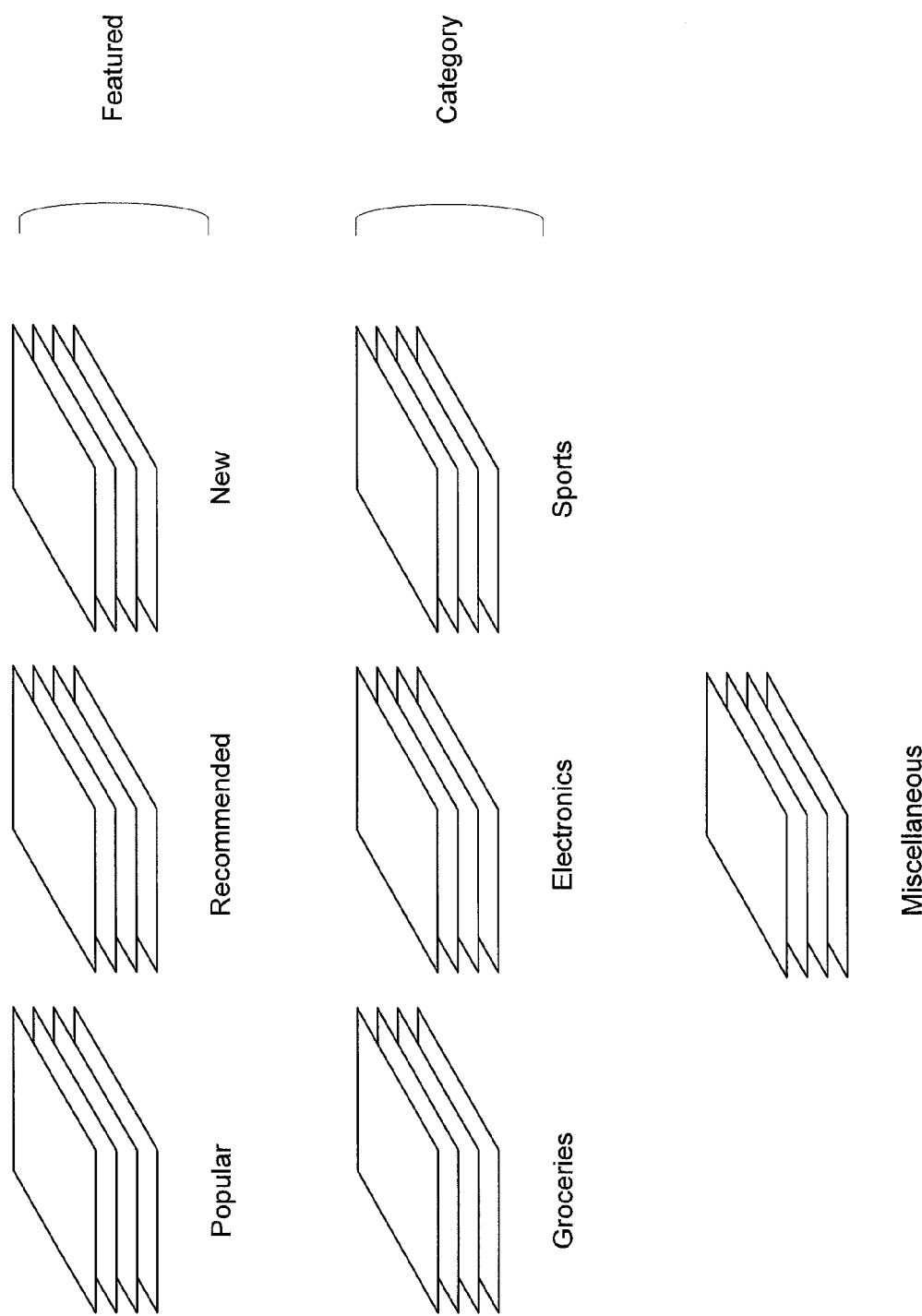
FIG. 4 illustrates an exemplary set of flyer stacks according to an embodiment of the present technology.

Turning to FIG. 3, a method according to an embodiment of the present disclosure is disclosed. The method includes creating at least one flyer stack having at least one stack definition (i.e. 300 in FIG. 3). The stack definition assigned to the flyer stack gives context to the flyer stack which is used by the system to assign the available digital flyers to one or more of the at least one flyer stack. For example, in one embodiment as shown in FIG. 4, three types of flyer stacks may be created. The first type of flyer stacks may be "featured" stacks that showcase digital flyers that deserve special attention. Within the first type of flyer stack, there may be a stack for "popular" flyers, "recommended" flyers, or "new" flyers. In other words, the "popular" stack would have a stack definition of "featured" and "popular"; the "recommended" stack would have a stack definition of "featured" and "recommended"; and, so on.

Similarly, a second type of flyer stacks may be created. FIG. 4 illustrates the second type of flyer stack being a number of category-based stacks such as groceries, electronics and sports. As with the "featured" stacks, the stacks in the "category" type would have a stack definition of "category" and "groceries", "category" and "electronics", and "category" and "sports", respectively. FIG. 4 further illustrates a third type of flyer stack that includes a "miscellaneous" stack for flyers that do not belong to any other stack. The flyer stack arrangement shown in FIG. 4 is for illustrative purposes only and it will be understood that any number of stacks may be created depending on the need.

Using the stack definition, digital flyers are assigned to one or more of the flyer stacks based on the contextual relevancy of the digital flyer (i.e. 302 in FIG. 3). In one embodiment, each digital flyer may be assigned a relevancy score for each flyer stack based on the content of the digital flyer. Using the relevancy score, the digital flyer would be assigned to the appropriate flyer stack.

With the digital flyers assigned to the flyer stacks, the availability of each digital flyer within each flyer stack is determined based on location and timing relevancy of the digital flyer (i.e. 304 in FIG. 3). For example, a digital flyer that is too remote from the viewer's location would be made unavailable. In another example, a digital flyer that has expired would be made unavailable.

The system then ranks the digital flyers in the flyer stack based on a flyer score (i.e. 306 in FIG. 3). Thus, the digital flyers are organized (i.e. assigned, availability assessed, and ranked/ordered) into at least one flyer stack. The organized information may be hereinafter referred to as flyer stack information. The details of the above method will now be described.

Flyer Stack—Contextual Relevancy

Assigning the digital flyer to one or more flyer stacks involves determining the contextual relevancy of the digital flyer (i.e. 302 in FIG. 3). In one embodiment, where there are category-based flyer stacks, a relevancy score may be determined for each flyer stack based on the content of the digital flyer. The relevancy score may be determined in a variety of ways. For example, the publisher or the merchant may explicitly assign a relevancy score to the digital flyer using a user interface. In another example, the relevancy score may be determined by evaluating the space occupied by each section on the digital flyer, number of items in each section and/or viewer behaviour on search terms.

To further elaborate on the last example, suppose a digital flyer has sections "meats", "produce" and "fruits". For example, the sections may be defined using polygon mapping information as described in the above referenced commonly owned patent applications. Based on these sections, it may be determined that the relevancy score for "groceries" stack is 100 while 0 for other flyer stacks. However, some digital flyers may include diverse sections, especially for merchants that carry a variety of items. In such a case, it may be beneficial to consider the number of items in each section to assess in which flyer stack the digital flyer should belong. In this scenario, it may be determined that the relevancy score for "groceries" stack is 70 while the "electronics" stack is 20. Furthermore, in another embodiment, the relevancy score may be adjusted based on viewer behaviour to a search term. For example, if a viewer searches for "electronics" and selects the aforementioned digital flyer, then the relevancy score may be adjusted to reflect this preference. It will be understood that the relevancy score may be a percentage or an absolute number or any other value from a reasonable scale. It will also be understood that the digital flyer may belong to none or one or more than one flyer stacks based on the determined relevancy score.

In an embodiment that includes "featured" stacks, a different mechanism may be used to determine the contextual relevancy of the digital flyer. For example, if the embodiment includes a "recommended" stack, the following exemplary implementations may be used. An implementation may include incorporating one or more top ranking digital flyers from each category stack. In another implementation, a round robin style selection may be used to ensure that the "recommended" stack contains a mixture of digital flyers. In a further implementation, a threshold may be assigned to each category of digital flyers. Each time a digital flyer is selected from the category, the threshold for that category may be increased to ensure diversity in the "recommended" stack.

In a further embodiment, digital flyers not assigned to any flyer stack may be considered for inclusion into a remainder or "miscellaneous" stack as shown in FIG. 4.

Flyer Stack—Availability

A digital flyer may be assigned to none or one or more flyer stacks based on the content of the digital flyer. However, the digital flyer assigned to a flyer stack does not necessarily mean that it is available to a particular viewer. In this embodiment, the availability of the digital flyer is determined based on the location and timing relevancy of the digital flyer (i.e. 304 in FIG. 3).

Flyers are often localized in nature as promotion availability and pricing varies. For example, a particular store location may be having an inventory clear-out while the same chain store at a different location may not be participating in this clear-out sale. In this particular embodiment, the availability of the digital flyer is determined based on the location of the viewer. Location of the viewer may be determined using a variety of ways, for example, through explicit entry, device specific API functions, IP geo-location and account profiles.

In one implementation, availability may be determined based on the viewer's location in relation to a pre-defined distribution zone. If the digital flyer is associated with a particular distribution zone, the digital flyer will be made available if the viewer is in that particular distribution zone. Other variations are possible. For example, there may be different versions of the same digital flyer for each distribution zone. Based on the location of the viewer, the specific version of the digital flyer associated with the distribution zone of the viewer may be made available. While the distribution zones may be defined in a number of ways, one implementation may leverage the paper flyer delivery distribution zones.

In another implementation, availability may be determined based on the distance between the store location and the viewer's location. For example, the distance may be based on the nearest physical store location of the merchant associated with the digital flyer. The determined distance is compared against a threshold distance to determine availability of the digital flyer to the viewer. This threshold distance may be fixed or configured for each merchant based on at least one criterion. For example, the threshold distance may be varied depending on the influence of the store. If the store is well recognized and popular, the threshold distance may be greater than a less popular or less recognized store. Level of recognition or popularity of a store may be determined based on page views, number of physical locations, viewers' requests and other factors. In another example, the threshold distance may be varied depending on the density of similar stores in the vicinity of the store. If the store is unique, the threshold distance may be greater than if there were many similar stores in the vicinity or neighbourhood or distribution zone. Other factors may be considered when determining the threshold distance. It will also be understood that the threshold distance may be different for each flyer stack.

However, to reduce computational resources, the viewer's location may be aggregated at a less granular level to pre-defined availability zones (e.g. Forward Sortation Area (FSA), neighbourhoods, or cities) and digital flyers may be pre-computed and cached for that area. Thus, instead of determining the availability of the digital flyer based on the viewer's exact location, availability may be determined based on the viewer's zone with respect to the nearest physical store location of the merchant. For example, a look-up table may be provided that indicates the availability of a digital flyer with respect to the pre-defined availability zones. When determining the availability of the digital flyer, a simple query of the look-up table would be sufficient to determine the availability of the digital flyer for the viewer.

In addition to determining availability based on location relevancy, availability may also be determined based on timing relevancy. Since flyers are often time sensitive, availability may be based on an availability period or a validity period or both. The availability period refers to the period of time when the digital flyer will be publicly available. The validity period refers to the period of time when the content and pricing in the digital flyer will be active. In this embodiment, the digital flyer will be made available if the current time is within the availability or validity period or both.

Flyer Stack—Flyer Score

Ranking of the digital flyers assigned and available in the flyer stack may be determined based on a flyer score. The digital flyer may have one flyer score applicable to all scenarios. In other implementations, the digital flyer may have multiple flyer scores depending on various factors such as geography, demographics, language, viewer's preference or any other factors.

The determination of the flyer score may also be based on a number of factors that may be weighted accordingly. Some factors include flyer quality, flyer or merchant popularity, budget and revenue, timing and newness, personalization and location. Each factor may produce a score that may be weighted accordingly to determine the overall flyer score. These factors are examples only and other factors may be included in the flyer score calculation. Details of these exemplary factors will now be described.

Flyer Quality

The quality of the digital flyer may be assessed in various ways. In one implementation, quality of the digital flyer may be assessed by taking into consideration the size of the flyer, quality and resolution of the flyer image making up the digital flyer, number of items, quality and quantity of sales and general visual appeal of the digital flyer. These considerations may be automatically assessed by the flyer stack system or assessed by a user of the flyer stack system and inputted using a user interface. For example, the general visual appeal of the digital flyer may be assessed by the community (i.e. crowd-sourcing).

Additionally, or alternatively, a feedback system may be incorporated to evaluate the quality and popularity of the digital flyer. For example, the feedback system may build on the feedback system discussed in the above referenced commonly owned patent applications. With the available statistics from the feedback system, the flyer score may be dynamically updated. Exemplary statistics may include engaged visitor rate, time spent and interactions. The engaged visitor rate measures the percentage of viewers that satisfy a minimum engagement criteria, such as engagement actions (e.g. click, pan, zoom) or time spent on the digital flyer. The time spent statistic may also be used on its own to infer quality. For example, the longer a viewer stays on the digital flyer, the better the inferred quality of the digital flyer. The engagement actions (i.e. interactions) may also be used separately to infer quality. For example, the more interactions a digital flyer receives, the better the inferred quality.

To ensure that the feedback statistics represent a sufficient base to adequately determine a quality score, a qualifying event may be required before the feedback statistics would be considered. For example, the qualifying event may be a day's worth of viewers before the feedback statistics could be considered for evaluating the quality of the digital flyer.

Popularity

Popularity may be measured in relation to the merchant or the digital flyer itself or both. Many different metrics may be used for assessing popularity of a merchant or flyer, which may be provided by the feedback system. One or a combination of these metrics can be used to calculate a popularity score. In one implementation, popularity may be determined based on the number of times a merchant's digital flyer is selected from a search result. The frequency in which the merchant's digital flyer is selected may be an indication of popularity. As with assessing the quality of the digital flyer, a qualifying event may be required. In this implementation, the qualifying event may be a measure of the number of searches conducted on the flyer stack system. For example, the qualifying event may be a week's worth of searches before the feedback statistics could be used in assessing popularity.

In another implementation, popularity may be determined using feedback data from a feedback system, such as the feedback system described in the above referenced commonly owned patent applications. For example, a user interface element may be provided that accepts direct input from the user of the system. The user interface element may be a "like" or "dislike" interface element that can be used to measure popularity of a digital flyer or a merchant or both. The "like" or "dislike" element may be aggregated to determine an absolute popularity, or, alternatively, may be used to determine a relative popularity when compared to other digital flyers or merchants of both. Furthermore, the rate at which the digital flyer or merchant receives a "like" or "dislike" may be used to assess the popularity trend. As with other popularity or quality metrics, a qualifying event may be imposed. In this implementation, the qualifying event may be a week's worth of visit before the feedback statistics could be considered when assessing popularity.

Revenue Optimization

The ranking of the digital flyer may also be altered to optimize revenue derived from the digital flyers. In one implementation, the ranking of the digital flyers within a flyer stack may be altered to prioritize digital flyers with higher revenue potential. This may be achieved by determining a revenue optimization score, which may be based on price per conversion, conversion rate per view and display revenue per view. In other words, "revenue optimization score"∝("price per conversion"*"conversion rate per view")+"display revenue per view". In this implementation, price per conversion refers to the price that a merchant agreed to pay per conversion event. The conversion event may be as simple as a selection of the digital flyer or more complex events such as a unique engaged visitor. Price per conversion may vary depending on the conversion event. The conversion rate per view measures the percentage of conversion events from the total number of viewing events. This information may be periodically computed by using information from the viewer's device. There may be one or more conversion rates per view associated with the digital flyer. The revenue optimization score may also take into consideration other revenues that may be earned as a direct result of a flyer view but not subject to any other preconditions (i.e. display revenue per view). Depending on the business goal of the flyer stack system, the revenue optimization score may be weighted when computing the flyer score. The implementation above is described as an example only.

In other implementations, the top one or more ranks of the flyer stack may be made available for bid or purchase.

Budget Optimization

Given that many merchants have marketing budgets, the flyer stack system may consider the merchant's specified budget when ranking the digital flyers. A merchant's budget may be classified as a hard budget or a soft budget or a combination of the two. A hard budget refers to a budget ceiling that cannot be changed and a soft budget refers to a budget ceiling that can be changed with sufficient notice.

When optimizing a merchant's soft budget, the system may spend the budget normally until a notice threshold, at which point the spending of the budget may be slowed to allow for the merchant to increase the budget. The budget spending can be slowed, for example, by artificially lowering the rank of the digital flyer.

With a hard budget, a similar notice threshold may be implemented but instead of slowing the budget spending to allow time for the merchant to increase the budget, the remaining budget may be rationed during the remainder of the budget period. The system may adjust the ranking of the digital flyer for the remainder of the budget period such that the budget is not exceeded.

Timing and Newness

As discussed in the context of determining the availability of the digital flyer assigned to a flyer stack, timing relevancy may also be taken into account when ranking the digital flyers in the flyer stack. For example, the flyer score may be varied depending on where in the availability period the digital flyer lies. In one implementation, if the digital flyer is at the beginning of the availability period (i.e. the digital flyer is new), it may be given a higher flyer score in this category. As another example, the flyer score may be varied depending on where in the validity period the digital flyer lies. In one implementation, if the digital flyer is near the end of the validity period, it may receive a higher flyer score in this category to bring attention to the expiring deals to the viewers.

Personalization

The flyer stack system may also provide a user interface to receive viewer's preferences. In one implementation, a "like" or "dislike" interface element may be provided to receive direct feedback from the viewer. This feedback may be stored and taken into consideration when ranking the digital flyers. In another implementation, the viewer may be presented with a user interface to select the desired category of digital flyers. Depending on the preference of the viewer, the rank of the digital flyers may be altered to suit the preference of the viewer. The viewer's personalization may be determined in other ways, including indirect methods that infer from the viewer's behaviour.

Location

As discussed in the context of determining the availability of the digital flyer assigned to a flyer stack, location relevancy may also be taken into account when ranking the digital flyers in the flyer stack.

Presentation—Overview

The flyer stack system organizes the digital flyers into at least one flyer stack. The information that includes how the digital flyers are organized into the at least one flyer stack (i.e. flyer stack information) is then communicated to a communication device on which the viewer views the digital flyers. The communication device includes a flyer navigation interface, which enables the viewer to navigate between digital flyers within each flyer stack and also between digital flyers belonging to different flyer stacks. For example, the viewer may browse through digital flyers in the "groceries" stack and also jump between digital flyers in the "groceries" stack and the "electronics" stack. Thus, the communication device receives the flyer stack information from the flyer stack system, the flyer stack information including a plurality of digital flyers organized into at least one flyer stack (i.e. 500 in FIG. 5). It will be understood that while the flyer stack information includes information about the plurality of digital flyers organized into at least one flyer stack, to minimize bandwidth usage, all the plurality of digital flyers may not be received by the communication device until required. Rather, for example, an index of the plurality of digital flyers organized into the at least one flyer stack may be received, which the communication device may use to download the necessary digital flyers subsequently. Thus, when referring to a plurality of digital flyers in the context of flyer stack information, it may be in reference to the actual digital flyer received from the flyer stack system, or it may only be an index or pointer to the digital flyer that is stored in the flyer stack system but not yet received by the communication system. Once received, the plurality of digital flyers received may be stored in the memory of the communication device. Also, all or some the digital flyers may be downloaded and stored in a memory of the communication device. In this situation, browsing of the digital flyers may be possible in a disconnected environment.

Figure 5:
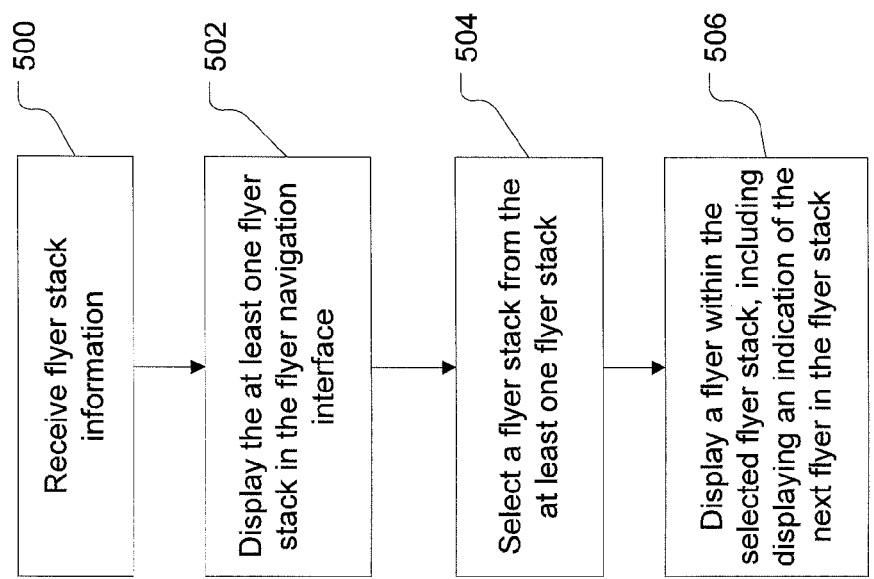
FIG. 5 illustrates a process for displaying the flyer stack information according to an embodiment of the present technology.

With the received flyer stack information, the device displays the at least one flyer stack in the flyer navigation interface (i.e. 502 in FIG. 5), selects a flyer stack from the at least one flyer stack (i.e. 504 in FIG. 5), and displays a digital flyer from the selected flyer stack in the flyer navigation interface including displaying an indication of the next digital flyer in the selected flyer stack, the next digital flyer being accessible by navigating to the indication (i.e. 506 in FIG. 5). The details will now be described.

Presentation—Displaying the Flyer Stack

The received flyer stack information contains a plurality of digital flyers organized into at least one flyer stack. This information is then displayed in the flyer navigation interface such that a viewer can efficiently navigate through the plurality of digital flyers. Since the plurality of digital flyers are assigned to the at least one flyer stack and ranked within the flyer stack, the viewer is able to efficiently browse through the most relevant digital flyers.

Within the flyer stack information, there is at least one flyer stack. For example, there may be a "Popular" stack, "Recommended" stack and "Favourite" stack. These flyer stacks are displayed in the flyer navigation interface (i.e. 502 in FIG. 5; see also 604 and 660 in FIG. 6A). In one implementation, the flyer stacks may be displayed as a drop-down menu. This allows the viewer to easily switch between the at least one flyer stack. The drop-down menus may be enhanced with information about the flyers such as thumbnails, validity period, and highlights of the flyers. Other implementations are possible to convey to the viewer that different flyer stacks exist.

Within each of the at least one flyer stack, there contains none or one or more digital flyers. In one implementation, there may be a minimum display threshold that can be used to show or hide flyer stacks that do not contain the minimum number of digital flyers. Digital flyers contained in the hidden flyer stack may be displayed as part of a "remainder" stack that contains digital flyers not belonging to any flyer stack.

Presentation—Navigation

The communication device also selects one of the flyer stacks displayed in the flyer navigation interface (i.e. 504 in FIG. 5). The selection may be done in a variety of ways. For example, if the flyer stack information includes a "recommended" stack, this stack may be selected by default. In another example, the flyer stack may be chosen based on the preference of the viewer. This preference may have been previously set through a user interface and the appropriate flyer stack may be chosen based on the preference and the stack definition associated with the flyer stack.

With the flyer stack selected, a flyer from the selected flyer stack is displayed in the flyer navigation interface (i.e. 506 in FIG. 5). In one embodiment, the flyer selected from the flyer stack is the top ranking flyer within the flyer stack. In addition to displaying the digital flyer, the interface displays an indication of the next digital flyer in the selected flyer stack, the next digital flyer being accessible by navigating to the indication. In one implementation, the indication is a user interface element which when selected displays the next digital flyer in the flyer navigation interface. The user interface element may be, for example, an arrow overlaid the flyer navigation interface. In another implementation, the indication may be a portion of the next digital flyer, the next digital flyer being accessible by navigating to the portion. To navigate to the next digital flyer, the viewer may select the portion or pan to the portion of the next digital flyer. In addition to navigating to the next digital flyer in the flyer stack, the flyer interface may also allow the viewer to navigate to the previous digital flyer in the flyer stack.

Figure 6A:
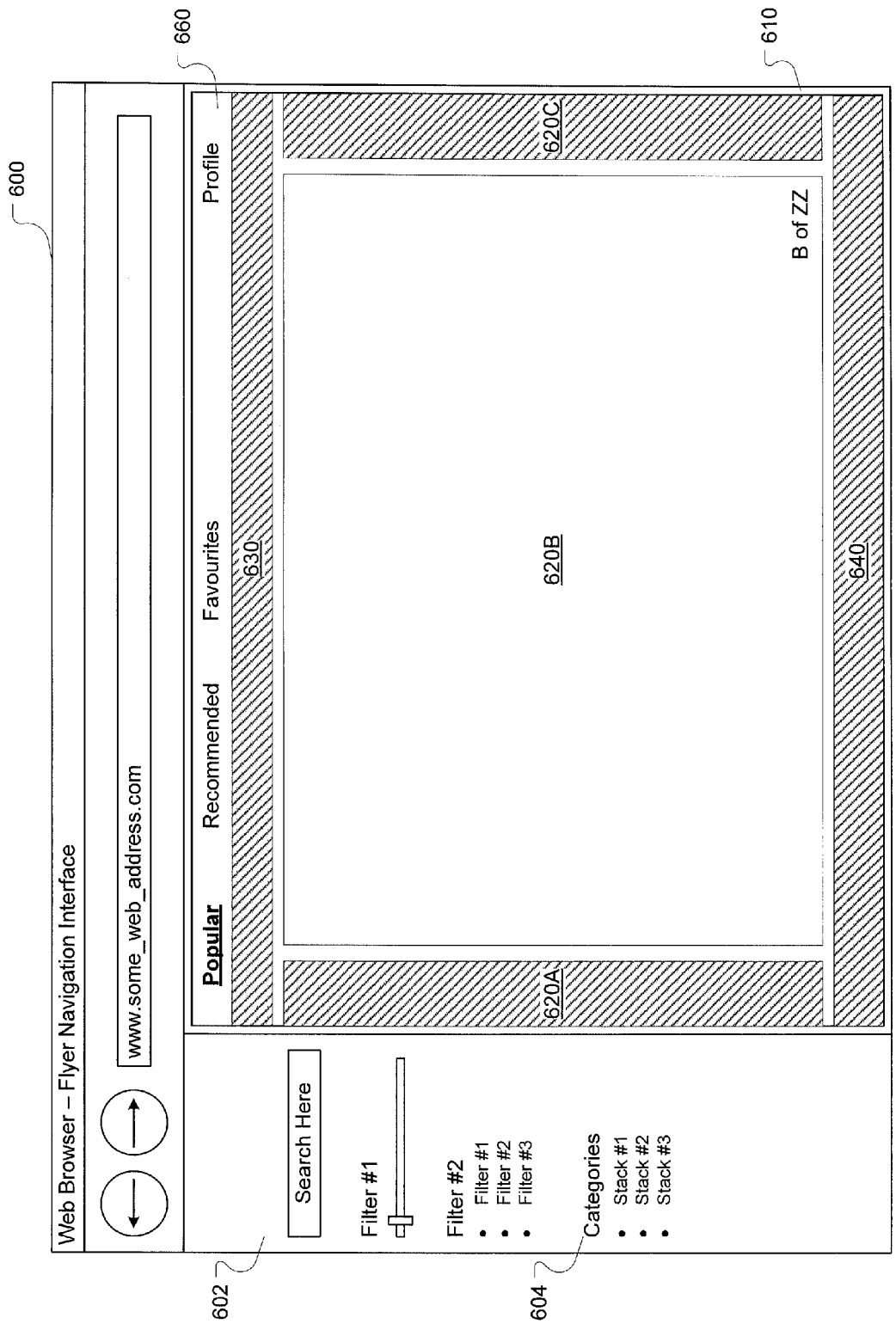
FIG. 6A illustrates an exemplary flyer navigation interface on which the plurality of digital flyers organized into at least one flyer stack is displayed.
Figure 6B:
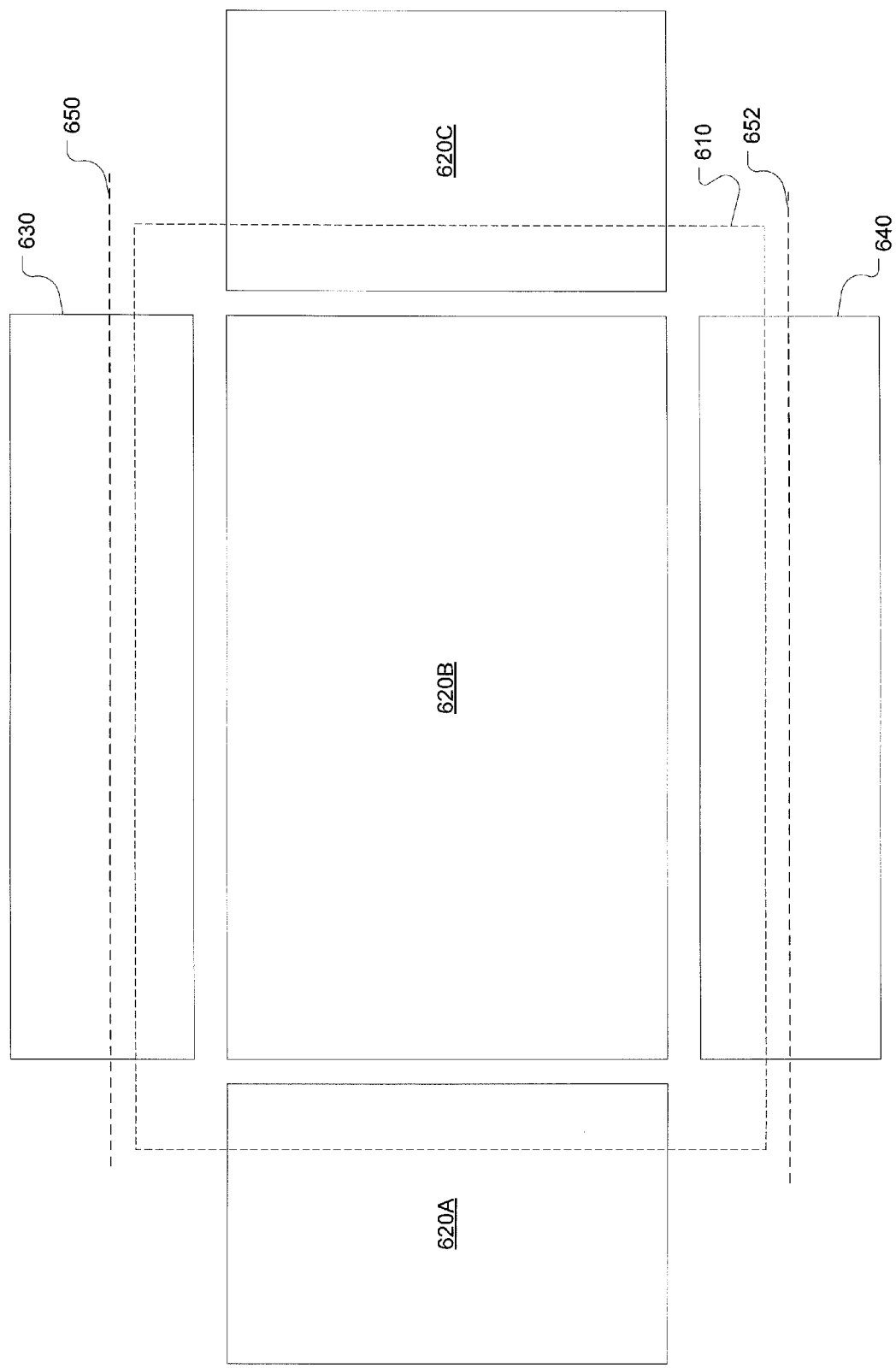
FIG. 6B illustrates a simplified view of the flyer navigation interface shown in FIG. 6A.

FIGS. 6A-6C illustrate an exemplary flyer navigation interface simplified for explanation purposes. In this implementation, the flyer navigation interface 600 is implemented in an Internet browser, which is executed on a processor of the communication device (e.g. 102, 104, 106 in FIG. 1) and displayed on a display of the communication device. However, it will be understood that the flyer navigation interface 600 may be implemented using a variety of different platforms able to implement the method and system as herein described. For example, the flyer navigation interface may be implemented as a standalone application on mobile and non-mobile computing devices.

Referring to FIG. 6A, the flyer navigation interface 600 may include a menu 602 that facilitates some of the features enabled by this technology. For example, the menu 602 may provide the viewer with a searching functionality. As it will be described below, the searching functionality may allow inter-flyer and intra-flyer searching that allows the content to be searched not only within a digital flyer but also across different digital flyers within the same flyer stack and across other flyer stacks. The menu 602 may also include filters that can be used to quickly filter through the digital flyer. Filtering may be enabled by utilizing polygon mapping technology as disclosed in the above referenced commonly owned patent applications. Because of the organization of the digital flyers into flyer stacks, the viewer is able to filter through not only the current digital flyer but also through different digital flyers within the same flyer stack and across other flyer stacks. For example, the filter may be used to highlight specific items or items that have particular discount. Additionally, the menu 602 may provide for menu elements (e.g. 604 in FIG. 6A) for the viewer to switch between different flyer stacks.

The flyer navigation interface 600 also includes a viewport area 610 where the digital flyers are displayed. While in this implementation the viewport 610 occupies a subset of the display on which the flyer navigation interface 600 is displayed, it will be understood that the viewport 610 may occupy the entire display. In the viewport 610, there is shown a current digital flyer 620. In FIG. 6A, the current digital flyer 620 is a multi-page digital flyer with flyer page 620B being the active page while portions of the previous page 620A and next page 620C are shown in the viewport 610 as the non-active pages. While the current digital flyer 620 is shown as a multi-page digital flyer, it will be understood that the current digital flyer 620 may be a single-page digital flyer.

The current digital flyer 620 starts with the digital flyer that was initially selected from the selected flyer stack (i.e. 504 in FIG. 5). In one embodiment, the initially selected digital flyer is the top ranking digital flyer from the selected flyer stack. As the viewer navigates through the digital flyers using the flyer navigation interface 600, the flyer page shown as the active page would change. If the current digital flyer 620 is a multi-page digital flyer, the viewer is able to browse through the other pages of the same flyer by navigating to the previous flyer page 620A or the next flyer page 620C (i.e. intra-flyer navigation). Navigation may be effected by panning or selecting the portion 620A, 620C or by selecting a user interface element such as arrows (as shown as 802A-D in FIG. 8). In the implementation shown in FIGS. 6A-6C, a portion of the previous and next page is shown (i.e. 620A and 620C in FIGS. 6A-6B, respectively), to which the viewer can pan by using, for example, a gesture on a touchscreen or inputs through a keyboard or mouse. Alternatively, or additionally, the viewer may select the displayed portion (620A or 620C in FIGS. 6A-6B). It will be understood that depending on the number of pages and the page of the digital flyer currently displayed in the flyer navigation interface, the next page 620C or previous page 620A may or may not be present.

In addition to intra-flyer navigation, the flyer navigation interface 600 allows for inter-flyer navigation. As shown in FIG. 6A, the flyer navigation interface 600 allows the viewer to navigate to other flyers (e.g. flyers 630 and 640 in FIG. 6B) within the same flyer stack. It will be understood that the flyers 630 and 640 may be one page from a multi-page or single-page digital flyer within the same flyer stack or it may simply be a representative page that indicates the identity of the previous flyer 630 or next flyer 640. In the flyer navigation interface 600 shown in FIG. 6A, the flyer 630 illustrates a flyer in a position above the current flyer 620 (hereinafter also referred to as "previous flyer") and the flyer 640 illustrates a flyer in a position below the current flyer 620 (hereinafter also referred to as "next flyer") in the same flyer stack. For example, referring to FIG. 7 to better visualize the positional aspect of the flyer stack, if the current flyer 620 is flyer 712 in flyer stack 700, the flyer 630 would be flyer 710 in flyer stack 700 and the flyer 640 would be flyer 714 in flyer stack 700. In FIGS. 6A-6C and 8, the next and previous digital flyers are accessible by navigating up or down, relative to the viewport 610, 800. This mimics the act of looking through a stack of flyers as shown in FIG. 7. However, it will be understood that navigating to the next or previous digital flyer is not limited to vertical navigation. In some embodiments, the next and previous digital flyers in the same stack may be indicated as 620A and 620C in FIG. 6A, while the next and previous pages of the digital flyer may be shown as 630 and 640 in FIG. 6A. It will be further understood, and also described using FIG. 6C below, that the next digital flyer in the flyer stack may be accessible after the last page of the current digital flyer.

Depending on the flyer stack implementation, the ranking of the flyer above and below the current flyer may change. In one implementation, the flyer stack may be a non-circular stack. Referring to FIG. 7, the flyer 710 in the first position of the flyer stack 700 is not linked to the flyer 720 in the last position of the flyer stack 700. Thus, in this implementation, flyer 710 would be the highest or top ranking flyer and the flyer 720 would be the lowest ranking flyer in the flyer stack 700. So, referring to FIGS. 5-7, the flyer navigation interface 600 may display the top ranking flyer 710 (i.e. 506 in FIG. 5) as the current flyer 620 and allow the viewer to navigate to the next digital flyer in the flyer stack (i.e. 712 in FIG. 7), which would be displayed as the flyer 640 depicted as the flyer below the current flyer 620. In this implementation, the flyer 640 would depict the next flyer and the flyer 630 would depict the previous flyer. However, since the flyer stack is a non-circular stack, when flyer 710 is the current flyer 620, previous flyer 630 would not be shown. After navigating to the next flyer, the current flyer 620 would become the next flyer (i.e. 712 in FIG. 7), while the previous flyer 630 would be the top ranking flyer previously displayed as the current flyer (i.e. 710 in FIG. 7) and the next flyer 640 would be the flyer subsequent to current flyer 620 previously displayed as the next flyer (i.e. 714 in FIG. 7). This process continues until the last rank flyer 720 in FIG. 7 is reached.

In another implementation, the flyer stack may be a circular stack. In this implementation, the flyer 740 in the first position of the flyer stack 730 is linked to the flyer 750 in the last position of the flyer stack 730. Thus, unlike the flyer stack 700, when the viewer reaches the flyer 750 in the flyer stack 730, the viewer is able to go directly to flyer 740 and vice versa. Referring to FIGS. 5-7, the flyer navigation interface 600 may display the flyer 740 in the first position in the flyer stack 730 (i.e. 506 in FIG. 5) as the current flyer 620 and allow the viewer to navigate through the flyer stack as discussed above. Similarly, the flyer 630 depicts the flyer in the position above the current flyer 620 in the flyer stack 730 (i.e. 750 in FIG. 7) and the flyer 640 depicts the flyer in the position below the current flyer 620 in the flyer stack 730 (i.e. 742 in FIG. 7). However, unlike the non-circular flyer stack implementation, the flyer 750 at the last position of the flyer stack 730 is not necessarily the lowest rank flyer in the flyer stack 730. This is due to the fact that the first position flyer 740 is linked to the last position flyer 750. In other words, if the current flyer 620 is the flyer 740 of the flyer stack 730, the flyers 630 and 640 in FIG. 6B would correspond to flyers 750 and 742 of flyer stack 730 in FIG. 7. If flyer 750 was the last rank flyer, it would receive equal prominence to flyer 742 in the flyer stack 730. Thus, in this implementation, the ranking of the flyers may be dynamic depending on the navigation characteristics of the viewer.

Now referring to FIG. 6B, which is a simplified view of the viewport 610 of FIG. 6A, navigating through the digital flyers will now be further explained. As shown, the viewport 610 displays the current page 620B from the current digital flyer 620 along with a portion of the previous page 620A and next page 620C. The viewport 610 also displays a portion of the next flyer 640 and previous flyer 630 in the same flyer stack. Thus, intra-flyer navigation may be achieved by navigating to the displayed portions 620A and 620C and inter-flyer navigation may be achieved by navigating to the portions of the previous and next digital flyer 630 and 640 displayed in the viewport 610. Navigation may be effected by panning (for example through gesturing), selecting or any other input methods detectable by a communication device. In the embodiment where panning is used, a flyer lock boundary 650, 652 may be present requiring a minimum engagement by the viewer before switching to the next or previous flyer in the flyer stack. In one implementation, a minimum pan velocity crossing the flyer lock boundary 650, 652 may be required before switching to the next or previous flyer in the flyer stack. In another implementation, a minimum distance beyond the flyer lock boundary 650, 652 may be required before switching to the next or previous flyer in the flyer stack. The presence of the flyer lock boundary 650, 652 ensures that viewers do not accidentally switch into the next or previous flyer in the stack.

In another embodiment, as shown in FIG. 6C, the flyer stack may be an inter-linked flyer stack. An inter-linked flyer stack is a flyer stack where each flyer in the flyer stack is linked to the next and previous digital flyers. As shown in FIG. 7, the flyer stack 760 has a plurality of digital flyers with each digital flyer being linked to one another. To illustrate the linked aspect of the inter-linked flyer stack, arrows 762 are shown. For example, the digital flyer 772 in the flyer stack 760 may have multiple pages. In an inter-linked flyer stack, the first page of the digital flyer 772 may be linked to last page of the digital flyer 770 and the last page of the digital flyer 772 may be linked to the first page of the digital flyer 774. In addition, the first page of the digital flyer 770 may be linked to the last page of the digital flyer 780. Thus, in this optional implementation, the flyer stack would be a combination of circular and inter-linked flyer stack. Referring back to FIG. 6C, an implementation of the inter-linked flyer stack is shown in the flyer navigation interface showing the viewport 610. As in previous embodiments, the viewport 610 shows a page from the current digital flyer 620. In this example, page 620G is shown from the current digital flyer 620. Moreover, in viewport 610, the previous and next digital flyer 630, 640 in the stack and the previous and next page 620F, 620H of the current digital flyer 620 are shown. However, in this implementation, the next digital flyer 640 is linked to the current digital flyer 620 so when the viewer reaches the last page (e.g. 620Z) of the current digital flyer 620, the next digital flyer 640 can be accessed as if it is the page after the last page in the current digital flyer 620. The same applies to the previous digital flyer 630 in the flyer stack. This allows for a fluid navigation experience between digital flyers in the flyer stack.

Figure 8:
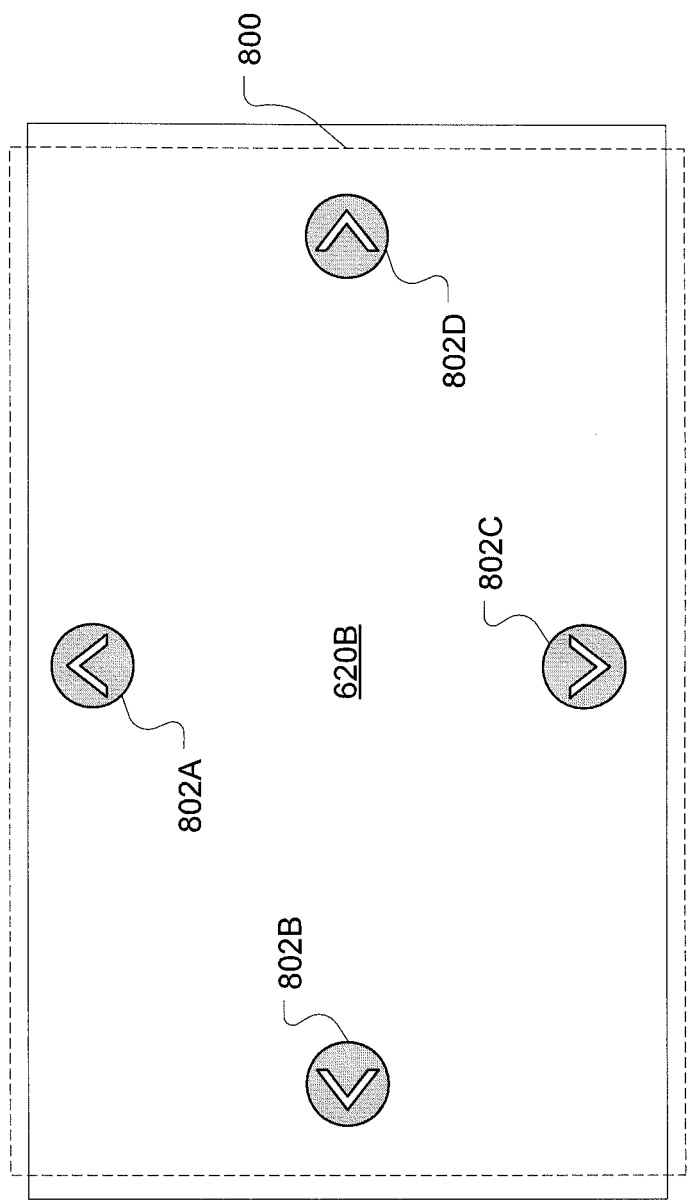
FIG. 8 illustrates another implementation of the flyer navigation interface.

Other implementations of flyer navigation interface 600 are possible, one of which is shown in FIG. 8. In this implementation, instead of the indication of the next or previous flyer (or next or previous page of the flyer) being a portion of the flyer or flyer page, a user interface element is provided, which when selected provides for inter-flyer and intra-flyer navigation. In FIG. 8, the user interface elements are shown as arrows 802A-D. The viewer is able to navigate within the same flyer stack (e.g. flyer stacks 700 FIG. 7) using arrows 802A and 802C and navigate within the pages of the current flyer 620 in the flyer stack using arrows 802B and 802D.

In the implementations shown in FIGS. 6A-6C and 8, the viewer is able to switch between flyer stacks through a user interface element in the flyer navigation interface. In FIG. 6A, the viewer is able to switch between different category stacks through menu elements 604. Alternatively, or additionally, the flyer navigation interface 600 may also provide a menu element 660 in the viewport 610 that allows the user to switch between flyer stacks easily. In FIG. 6A, three flyer stacks "Popular", "Recommended" and "Favourites" are shown, with the current flyer stack being the "Popular" stack. By selecting the "Recommended" stack, the flyer navigation interface 600 would switch to the "Recommended" stack and display the top ranking flyer from that stack as the current digital flyer 620. The flyer stacks shown in the menu element 660 may also allow the viewer to switch to a specific flyer within the flyer stack. For example, the menu element 660 may be in the form of a drop-down, which when selected displays the digital flyers in each flyer stack. Thus, by selecting the "Recommended" stack, the digital flyers within the "Recommended" stack may be displayed in the menu element 660, which may allow the viewer to select the specific digital flyer within the "Recommend" stack.

Figure 9:
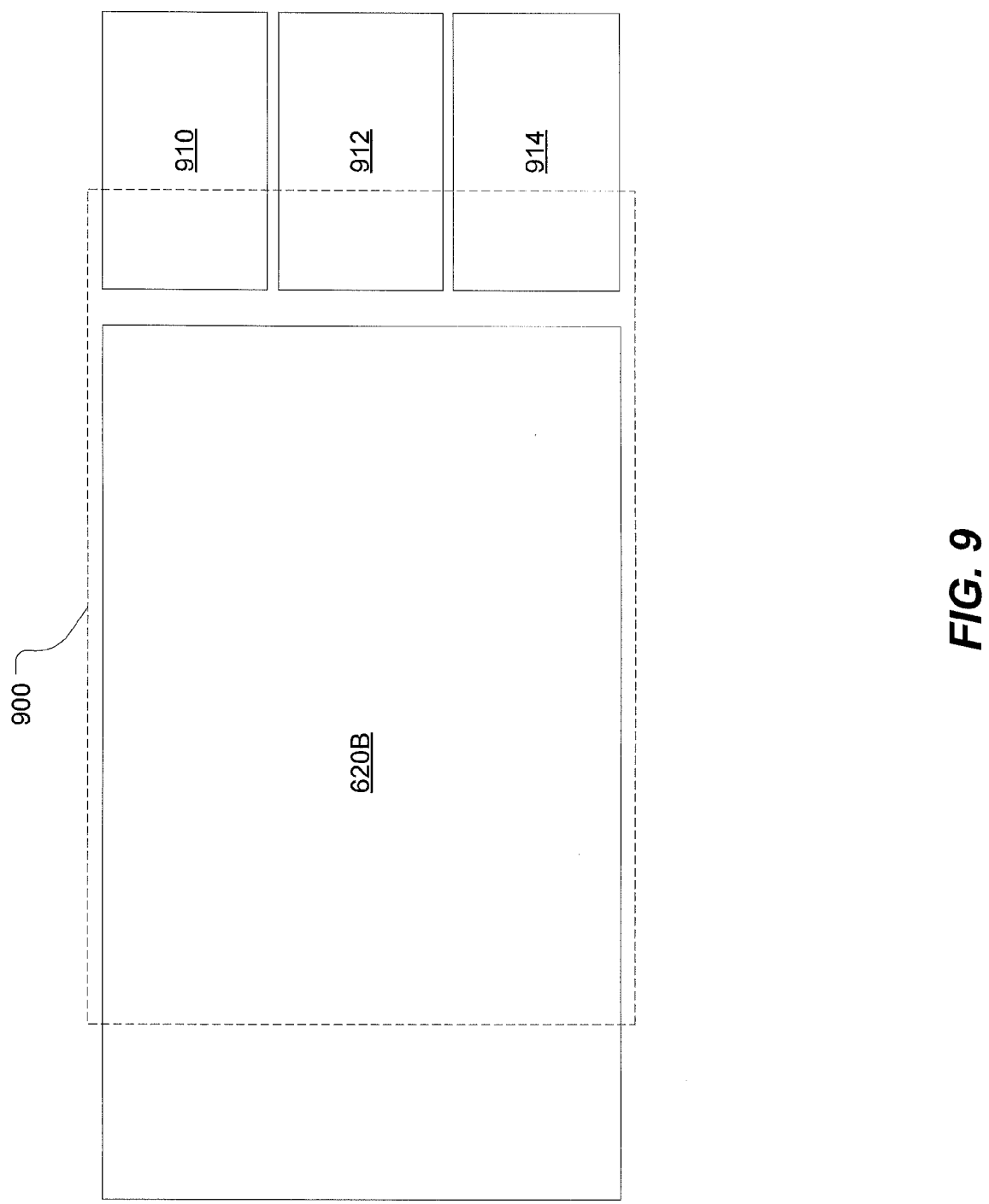
FIG. 9 illustrates a simplified view of the flyer navigation interface having contextually injected digital flyers around the perimeter of the current digital flyer.

Another implementation of the flyer navigation interface is shown in FIG. 9, which is being shown through viewport 900. In this implementation, in addition to the current digital flyer 620 (in FIG. 9, flyer page 620B from the current digital flyer 620 is shown as in other embodiments), the flyer navigation interface includes contextually injected digital flyers 910, 912 and 914. These digital flyers may be injected in a number of different areas. For example in FIG. 9, the digital flyers 910, 912 and 914 are injected around the perimeter of the current flyer page 620B. As the viewer pans, the viewport 900 displays the contextually injected digital flyers 910, 912 and 914. In this implementation, the viewer may be able to navigate through multiple-pages of the digital flyer 910-914 by panning or selecting the next or previous page of the digital flyer. In addition, the viewer may be able to zoom-in and zoom-out of the contextually injected digital flyers, separate from the current digital flyer 620 shown in the flyer navigation interface.

It will also be understood that the digital flyers may be injected within the current flyer page 620B as links depending on the content of the current flyer page 620B. For example, if the current digital flyer 620 contains a section on "Electronics", a link to a popular or high ranking "Electronics" digital flyer may be injected within the pages of the current digital flyer 620.

Selection of the digital flyers that are available for injection may be done in a number of ways. In one implementation, selection may be based on manual curation. For example, a user interface may be provided that allows the selection of potentially injectable digital flyers. These digital flyers may be "featured" digital flyers from a particular merchant who has purchased this space. In another implementation, the selection may be based on the flyer stack. For example, the top rank flyers from the at least one flyer stack may be injected. In a further implementation, the selection may be based on collaborative filtering. This type of filtering considers the usage patterns of different flyer viewers. The usage pattern may be determined in a variety of ways as described in this disclosure. For example, a feedback system may be used to determine the usage pattern of viewers of digital flyer. In another example, viewers' preferences may be directly measured by providing a user interface element such as "like" or "dislike" button. Any one or more of these and other selection may be possible to contextually inject digital flyers into the flyer navigation interface. In the different implementations, the availability of the injectable digital flyers may be further subject to the availability of the digital flyers as discussed above with respect to availability within an assigned flyer stack.

Inter-Flyer Searching

The organization of the one or more digital flyers into at least one flyer stack allows viewers to not only search within the current digital flyer but also across multiple digital flyers in an efficient way. Moreover, the search results may be presented and navigated in an efficient way by utilizing the organized information.

As described in the present disclosure, the plurality of digital flyers are organized into at least one flyer stack. This organized information is also referred to as flyer stack information. After creation, the information is stored in a structured manner for easy retrieval. For example, the flyer stack information may be stored in a database so that information can be easily accessed and cross-referenced. In one implementation, the flyer stack information may store the information in a hierarchical structure. For example, the information may be organized as follows: (i) at least one flyer stack and the flyer stack definition of each flyer stack, (ii) the digital flyers contained in each flyer stack, availability of each digital flyer and the order in which the digital flyers are to appear; and (iii) individualized information about each digital flyer in the flyer stack, for example, the contained items, items to highlight, and other information pertaining to the particular digital flyer. More granular information may be included depending on the information required. For example, there may be multiple information entries for the same digital flyers depending on the localization, availability and other factors. In addition, to speed up searching through the flyer stack information, an index of the flyer stack information may be created.

Figure 10:
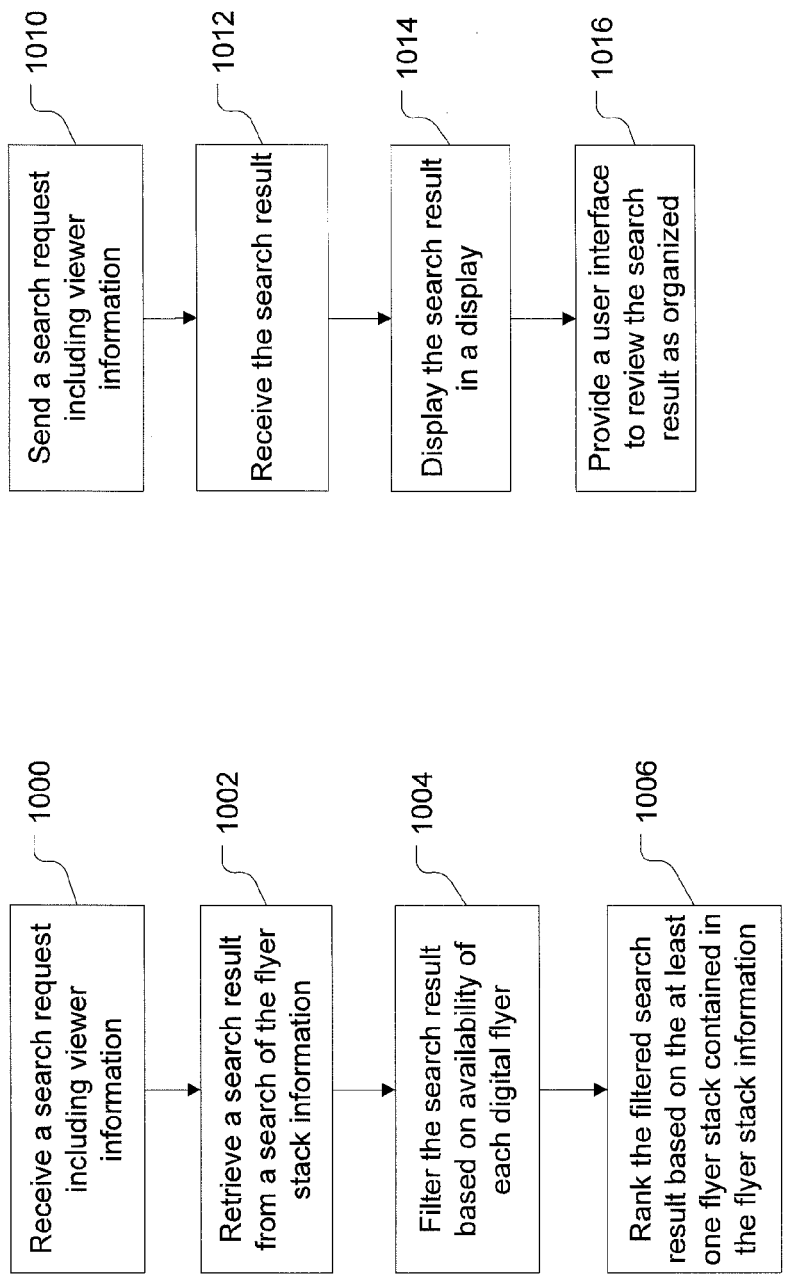
FIG. 10 illustrates a process for searching multiple digital flyers using the flyer stack information.

Thus, inter-flyer searching is provided by receiving a search request (i.e. 1000 in FIG. 10). The search request includes information about the viewer who is making the search request to search through the plurality of digital flyers. The viewer information includes information about the viewer viewing the plurality of digital flyers on the communication device. For example, the location of the viewer may be included in the viewer information. Furthermore, the viewer information comprises the current digital flyer that the viewer is currently viewing. In one embodiment, the viewer information may further include the flyer stack information. In other embodiments, the flyer stack information may be retrieved from memory on the server receiving the search request. In a further embodiment, the flyer stack information may be reconstructed using the viewer information that was sent with the search request. In response to the search request received, a search result is retrieved by searching the flyer stack information (i.e. 1002 in FIG. 10). In one embodiment, to speed up searching, the flyer stack information may be indexed and the search may be performed using the index. The search result is then filtered based on the availability of each digital flyer, information about the availability of each digital flyer being contained in the flyer stack information (i.e. 1004 in FIG. 10). For example, if a particular digital flyer included in the search result is relevant to the search but not available to the viewer, this particular digital flyer is removed from the search result. The filtered search result is then ranked according to which flyer stack each digital flyer belongs (i.e. 1006 in FIG. 10). In one implementation, first priority may be given to items in the search result belonging to the current digital flyer, second priority may be given to the items in the search result belonging to digital flyers in the current flyer stack and third priority may be given to the items in the search result belonging digital flyers in other flyer stacks. While first, second and third priority do not necessarily represent the ranking order, in some embodiments, first priority may be higher in ranking order than the second priority and the second priority may be higher in ranking order than the third priority.

The communication device on which the search was requested then receives the search result, the search result containing relevant items as contained in the digital flyers in the at least one flyer stack and organized and filtered using the flyer stack information (i.e. 1010 and 1012 in FIG. 10). The device then displays the search result in a display of the communication device (i.e. 1014 in FIG. 10). For example, the search result may be displayed in a flyer navigation interface as discussed in the present disclosure. Also, a user interface is provided that allows the viewer to review the relevant items in the search result as it was organized (i.e. 1016 in FIG. 10).

An exemplary flyer navigation interface for displaying the search result will now be discussed using FIG. 11, which has been simplified to only show the viewport 1100. It will also be understood that some or all of the features discussed in this present disclosure may be incorporated along with the interface showing the search result. In the viewport 1100, a flyer page 1102 of a digital flyer is shown. The flyer page 1102 is from a digital flyer associated with the search result received from a server. The flyer page 1102 may be one of a multi-page digital flyer or may be the only page in a single-page digital flyer. On the flyer page 1102, items included in the search result are displayed, for example, as 1104 and 1106. In this implementation, the relevant items in the search result (e.g. 1104 and 1106) are highlighted by using polygons 1104 and 1106. This may leverage the polygon mapping technology discussed in the above referenced commonly owned patent applications. Furthermore, a user interface 1110 is provided for reviewing the search result as it was organized. For example, if the search result contains fifty relevant items after the search result was filtered and ranked using the flyer stack information, the user interface 1110 allows the viewer to view the fifty relevant items in the ranked order. In the user interface 1110, the switching between the relevant items can be achieved by selecting the arrows as shown on the user interface 1110. Since the search result includes relevant items in the current digital flyer and digital flyers in the same flyer stack and other flyer stacks, the viewer is able to search through multiple digital flyers and review the search result in an organized way.

While the patent disclosure is described in conjunction with the specific embodiments, it will be understood that it is not intended to limit the patent disclosure to the described embodiments. On the contrary, it is intended to cover alternatives, modifications, and equivalents as may be included within the scope of the patent disclosure as defined by the appended claims. In the description below, numerous specific details are set forth in order to provide a thorough understanding of the present patent disclosure. The present patent disclosure may be practiced without some or all of these specific details. In other instances, well-known process operations have not been described in detail in order not to unnecessarily obscure the present patent disclosure.

It is further understood that the use of relational terms such as first and second, and the like, if any, are used solely to distinguish one from another entity, item, or action without necessarily requiring or implying any actual such relationship or order between such entities, items or actions.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Some portions of the detailed description in the above are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the above discussions, it is appreciated that throughout the specification discussions utilizing terms such as "processing," "computing," "calculating," "determining," or the like, refer to the action and/or processes of a computer or computing system, or similar electronic computing media player device, that manipulate and/or transform data represented as physical, such as electronic, quantities within the computing system's registers and/or memories into other data similarly represented as physical quantities within the computing system's memories, registers or other such information storage, transmit session or display devices.

Embodiments within the scope of the present disclosure can be implemented in digital electronic circuitry, or in computer hardware, firmware, software, or in combinations thereof. Apparatus within the scope of the present disclosure can be implemented in a computer program product tangibly embodied in a machine-readable storage medium for execution by a programmable processor; and method actions within the scope of the present disclosure can be performed by a programmable processor executing a program of instructions to perform functions of the present disclosure by operating on input data and generating output. Embodiments within the scope of the present disclosure may be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Embodiments within the scope of the present disclosure include computer-readable media for carrying or having computer-executable instructions, computer-readable instructions, or data structures stored thereon. Such computer-readable media may be any available media, which is accessible by a general-purpose or special-purpose computer system. Examples of computer-readable media may include physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system. Any of the foregoing can be supplemented by, or incorporated in, ASICs (application-specific integrated circuits). It should be understood that embodiments of the present disclosure may be used in a variety of applications. Although the present disclosure is not limited in this respect, the methods disclosed herein may be used in many apparatuses such as in the transmitters, receivers and transceivers of a radio system. Radio systems intended to be included within the scope of the present disclosure include, by way of example only, cellular radiotelephone communication systems, satellite communication systems, two-way radio communication systems, one-way pagers, two-way pagers, personal communication systems (PCS), personal digital assistants (PDA's), notebook computers in wireless local area networks (WLAN), wireless metropolitan area networks (WMAN), wireless wide area networks (WWAN), or wireless personal area networks (WPAN, and the like).

What is claimed is:

1. A communication device for displaying a plurality of digital flyers, the communication device comprising:
   a memory storing instructions; and
   a processor for executing instructions, which when executed configure the communication device to:
      receive, from a server via the communication module, flyer stack information, the flyer stack information comprising a plurality of different flyer stacks, each one of the plurality of different flyer stacks comprising a plurality of digital flyers, wherein each one of the plurality of different flyer stacks is assigned a stack definition and each one of the plurality of digital flyers is assigned to the plurality of different flyer stacks based on the contextual relevancy of the digital flyer to the stack definition and an availability of the digital flyer, wherein the availability of the digital flyer is based on the location of the viewer and a time period;
      display at least one flyer stack of the plurality of different flyer stacks in a flyer navigation interface;
      select a flyer stack from the at least one displayed flyer stack; and
      display a digital flyer from the selected flyer stack in the flyer navigation interface as a current digital flyer, wherein each one of the plurality of digital flyers assigned to the flyer stack is assigned a ranking based on navigation characteristics of a viewer and each one of the plurality of digital flyers is selected for display based on the rank score, including displaying an indication of a next digital flyer of the plurality of digital flyers in the selected flyer stack, the next digital flyer being accessible by navigating to the indication, and a further indication for navigating within the current digital flyer.

2. The communication device according to claim 1, wherein the plurality of digital flyers contained in the flyer stack information comprises a reference to the plurality of digital flyers.

3. The communication device according to claim 2, wherein the flyer navigation interface is further configured to:
   receive the content of the digital flyer from the selected flyer stack using the reference contained in the flyer stack information.

4. The communication device according to claim 1, wherein the current digital flyer initially displayed in the flyer navigation interface is a top ranking digital flyer from the selected flyer stack.

5. The communication device according to claim 1, wherein the indication includes an indication of a previous digital flyer in the selected flyer stack, the previous digital flyer being accessible by navigating to the indication.

6. The communication device according to claim 5, wherein the indication is a user interface element which when selected displays the next digital flyer or the previous digital flyer, or both, in the flyer navigation interface.

7. The communication device according to claim 5, wherein the indication is a portion of the previous digital flyer or the next digital flyer, or both, in the selected flyer stack, the previous digital flyer or the next digital flyer, or both, being accessible by navigating to the portion.

8. The communication device according to claim 7, wherein the instructions executed by the processor further configure the communication device to provide a flyer lock boundary, the flyer lock boundary requiring a minimum engagement by a viewer of the digital flyer before switching to the next digital flyer.

9. The communication device according to claim 1, wherein the further indication includes an indication of a previous page or next page, or both, of the current digital flyer in the selected flyer stack, the previous page or next page, or both, of the digital flyer being accessible by navigating to the further indication.

10. The communication device according to claim 1, wherein the at least one flyer stack comprises non-circular flyer stack, circular flyer stack, or inter-linked flyer stack, or combination thereof.

11. The communication device according to claim 1, wherein the instructions executed by the processor further configure the communication device to further receive over the communication module a selection of at least one digital flyer in the flyer stack information for injection into the flyer navigation interface, the injected at least one digital flyer being accessible from the current digital flyer.

12. A method of displaying a plurality of digital flyers on a communication device, the method comprising:
receiving flyer stack information from a server, the flyer stack information comprising a plurality of different flyer stacks, each one of the plurality of different flyer stacks comprising a plurality of digital flyers, wherein each one of the plurality of different flyer stacks is assigned a stack definition and each one of the plurality of digital flyers is assigned to the plurality of different flyer stacks based on the contextual relevancy of the digital flyer to the stack definition and an availability of the digital flyer, wherein the availability of the digital flyer is based on the location of the viewer and a time period;
displaying at least one flyer stack of the plurality of different flyer stacks in a flyer navigation interface;
selecting a flyer stack from the at least one displayed flyer stack; and
displaying a digital flyer from the selected flyer stack in the flyer navigation interface as a current digital flyer wherein each one of the plurality of digital flyers assigned to the flyer stack is assigned a ranking based on navigation characteristics of a viewer and each one of the plurality of digital flyers is selected for display based on the rank score, including displaying an indication of a next digital flyer of the plurality of digital flyers in the selected flyer stack, the next digital flyer being accessible by navigating to the indication, and displaying a further indication for navigating within the current digital flyer.

13. The method according to claim 12, wherein displaying the at least one flyer stack in the flyer navigation interface further comprises determining that the at least one flyer stack contains a minimum number of digital flyers.

14. The method according to claim 12, wherein displaying the at least one flyer stack in the flyer navigation interface comprises displaying the at least one flyer stack as a menu element in the flyer navigation interface.

15. The method according to claim 12, wherein the indication is a user interface element which when selected displays the next digital flyer in the flyer navigation interface.

16. The method according to claim 12, wherein the indication is a portion of the next digital flyer in the selected flyer stack, the next digital flyer being accessible by navigating to the portion.

17. The method according to claim 16, further comprising a flyer lock boundary, the flyer lock boundary requiring a minimum engagement by a viewer of the digital flyer before switching to the next digital flyer.

18. The method according to claim 17, wherein the minimum engagement comprises a minimum pan velocity crossing the flyer lock boundary or a minimum distance beyond the flyer lock boundary, or both.

19. The method according to claim 16, wherein navigating to the portion comprises panning to the portion or selecting the portion of the previous digital flyer or both.

20. A non-transitory computer readable storage medium storing instructions or statements for use in the execution in a processor of a method for displaying applications on a mobile device, the method comprising:
receiving flyer stack information from a server, the flyer stack information comprising a plurality of different flyer stacks, each one of the plurality of different flyer stacks comprising a plurality of digital flyers, wherein each one of the plurality of different flyer stacks is assigned a stack definition and each one of the plurality of digital flyers is assigned to the plurality of different flyer stacks based on the contextual relevancy of the digital flyer to the stack definition and an availability of the digital flyer, wherein the availability of the digital flyer is based on the location of the viewer and a time period;
displaying at least one flyer stack of the plurality of different flyer stacks in a flyer navigation interface;
selecting a flyer stack from the at least one displayed flyer stack; and
displaying a digital flyer from the selected flyer stack in the flyer navigation interface as a current digital flyer wherein each one of the plurality of digital flyers assigned to the flyer stack is assigned a ranking based on navigation characteristics of a viewer and each one of the plurality of digital flyers is selected for display based on the rank score, including displaying an indication of a next digital flyer of the plurality of digital flyers in the selected flyer stack, the next digital flyer being accessible by navigating to the indication, and displaying a further indication for navigating within the current digital flyer.

\* \* \* \* \*